United States Patent
Tu et al.

(10) Patent No.: US 11,922,544 B2
(45) Date of Patent: Mar. 5, 2024

(54) UTILIZING CLUSTERING TO SYNTHESIZE VECTOR PATTERNS IN DIGITAL IMAGES

(71) Applicant: Adobe Inc., San Jose, CA (US)

(72) Inventors: Peihan Tu, College Park, MD (US); Li-Yi Wei, Redwood City, CA (US)

(73) Assignee: Adobe Inc., San Jose, CA (US)

( * ) Notice: Subject to any disclaimer, the term of this patent is extended or adjusted under 35 U.S.C. 154(b) by 31 days.

(21) Appl. No.: 17/411,584

(22) Filed: Aug. 25, 2021

(65) Prior Publication Data

US 2023/0070286 A1    Mar. 9, 2023

(51) Int. Cl.
  G06T 11/20   (2006.01)
  G06F 18/22   (2023.01)
  G06F 18/23   (2023.01)
  G06T 11/60   (2006.01)

(52) U.S. Cl.
  CPC ............ G06T 11/203 (2013.01); G06F 18/22 (2023.01); G06F 18/23 (2023.01); G06T 11/60 (2013.01); *G06T 2200/24* (2013.01)

(58) Field of Classification Search
  CPC ... G06T 11/60; G06T 11/203; G06T 2200/24; G06K 9/6215; G06K 9/6218
  See application file for complete search history.

(56) References Cited

PUBLICATIONS

Ma et al., "Discrete Element Textures", ACM Trans. on Graph., vol. 30, No. 4, Article 62, Jul. 2011, pp. 62:1-62:10 (Year: 2011).*

R. Roveri, et al., "Example Based Repetitive Structure Synthesis", Eurographics Symposium on Geometry Processing 2015, vol. 34, No. 5, 2015, pp. 39-52 (Year: 2015).*

Peihan Tu, Dani Lischinski, and Hui Huang. 2019. Point Pattern Synthesis via Irregular Convolution, Computer Graphics Forum, vol. 38, No. 5 (2019), pp. 109-122, at https://doi.org/10.1111/cgf.13793 (Year: 2019).*

P. Tu, et al., "Continuous Curve Textures," ACM Trans. Graph, vol. 39, No. 6, Article No. 168, Dec. 2020, pp. 1-16, https://doi.org/10.1145/3414685.3417780 (Year: 2020).*

Ma et al., "Dynamic Element Textures". ACM Trans. Graph, vol. 32, No. 4, Article 90, Jul. 2013, pp. 90:1-90:10 (Year: 2013).*

(Continued)

*Primary Examiner* — Jin Cheng Wang
(74) *Attorney, Agent, or Firm* — Keller Preece PLLC

(57) ABSTRACT

The present disclosure relates to systems, non-transitory computer-readable media, and methods that utilize an optimization model for generating vector patterns with complex vector structures. For example, the disclosed systems iteratively optimize the similarity between local input and output neighborhoods that account for clusters. Specifically, based on an input exemplar vector image, the disclosed systems generate a sample input cluster representation for more robust iterative sample optimization and pattern reconstruction. To illustrate, the disclosed systems optimize output cluster configurations based on input clusters such that the output clusters minimize a shape energy and a link energy (e.g., to better preserve shape and structure details from the original vector pattern in the input exemplar vector image). From the output clusters, the disclosed systems can reconstruct additional vector elements to create a new vector image with a synthetic vector pattern.

20 Claims, 18 Drawing Sheets

(56) References Cited

PUBLICATIONS

P. Tu, et al., "Clustered Vector Textures", ACM Trans. Graph., vol. 41, No. 4, Article 159, Jul. 2022, pp. 159:1-159:23 (Year: 2022).*

Pascal Barla, Simon Breslav, Joëlle Thollot, François Sillion, and Lee Markosian. 2006. Stroke pattern analysis and synthesis. In Computer Graphics Forum, vol. 25. Wiley Online Library, 663-671.

Connelly Barnes, Eli Shechtman, Adam Finkelstein, and Dan B Goldman. 2009. Patch-Match: A Randomized Correspondence Algorithm for Structural Image Editing. ACM Trans. Graph. 28, 3, Article 24 (Jul. 2009), 11 pages. https://doi.org/10.1145/1531326.1531330.

Connelly Barnes and Fang-Lue Zhang. 2017. A survey of the state-of-the-art in patch-based synthesis. Computational Visual Media 3, 1 (2017), 3-20.

Robert L Cook. 1986. Stochastic sampling in computer graphics. ACM Transactions on Graphics (TOG) 5, 1 (1986), 51-72.

Jean-Dominique Favreau, Florent Lafarge, and Adrien Bousseau. 2017. Photo2clipart: Image Abstraction and Vectorization Using Layered Linear Gradients. ACM Trans. Graph. 36, 6, Article 180 (Nov. 2017), 11 pages. https://doi.org/10.1145/3130800.3130888.

Noa Fish, Lilach Perry, Amit Bermano, and Daniel Cohen-Or. 2020. SketchPatch: Sketch Stylization via Seamless Patch-level Synthesis. ACM Trans. Graph. 39, 6, Article 227 (122020). https://doi.org/10.1145/3414685.3417816.

Jakub Fišer, Ondřej Jamriška, Michal Lukáč, Eli Shechtman, Paul Asente, Jingwan Lu, and Daniel Sýkora. 2016. StyLit: Illumination-Guided Example-Based Stylization of 3D Renderings. ACM Trans. Graph. 35, 4, Article 92 (Jul. 2016), 11 pages. https://doi.org/10.1145/2897824.2925948.

Yaroslav Ganin, Sergey Bartunov, Yujia Li, Ethan Keller, and Stefano Saliceti. 2021. Computer-Aided Design as Language. arXiv:cs.CV/2105.02769.

S. Gold and A. Rangarajan. 1996. A graduated assignment algorithm for graph matching. IEEE Transactions on Pattern Analysis and Machine Intelligence 18, 4 (1996), 377-388. https://doi.org/10.1109/34.491619.

Paul Guerrero, Gilbert Bernstein, Wilmot Li, and Niloy J. Mitra. 2016. PATEX: Exploring Pattern Variations. ACM Trans. Graph. 35, 4, Article 48 (Jul. 2016), 13 pages. https://doi.org/10.1145/2897824.2925950.

Jianwei Guo, Haiyong Jiang, Bedrich Benes, Oliver Deussen, Xiaopeng Zhang, Dani Lischinski, and Hui Huang. 2020. Inverse Procedural Modeling of Branching Structures by Inferring L-Systems. ACM Trans. Graph. 39, 5, Article 155 (Jun. 2020), 13 pages. https://doi.org/10.1145/3394105.

Alejo Hausner. 2001. Simulating Decorative Mosaics. In SIGGRAPH '01. 573-580. https://doi.org/10.1145/383259.383327.

Aaron Hertzmann, Charles E. Jacobs, Nuria Oliver, Brian Curless, and David H. Salesin. 2001. Image Analogies. In SIGGRAPH '01. Association for Computing Machinery, New York, NY, USA, 327-340. https://doi.org/10.1145/383259.383295.

Chen-Yuan Hsu, Li-Yi Wei, Lihua You, and Jian Jun Zhang. 2018. Brushing Element Fields. In SIGGRAPH Asia 2018 Technical Briefs (SA '18). Article 6, 4 pages. https://doi.org/10.1145/3283254.3283274.

Chen-Yuan Hsu, Li-Yi Wei, Lihua You, and Jian Jun Zhang. 2020. Autocomplete Element Fields. In CHI '20. 1-13. https://doi.org/10.1145/3313831.3376248.

Siu Chi Hsu and Irene H. H. Lee. 1994. Drawing and Animation Using Skeletal Strokes. In SIGGRAPH '94. 109-118. https://doi.org/10.1145/192161.192186.

Hao-Da Huang, Xin Tong, and Wen-Cheng Wang. 2007. Accelerated parallel texture optimization. Journal of Computer Science and Technology 22, 5 (2007), 761-769.

T. Hurtut, P.-E. Landes, J. Thollot, Y. Gousseau, R. Drouillhet, and J.-F. Coeurjolly. 2009. Appearance-guided Synthesis of Element Arrangements by Example. In NPAR '09. 51-60. https://doi.org/10.1145/1572614.1572623.

Takashi Ijiri, Radomír Mech, Takeo Igarashi, and Gavin Miller. 2008. An Example-based Procedural System for Element Arrangement. In Computer Graphics Forum, vol. 27. Wiley Online Library, 429-436.

Jennifer Jacobs, Joel Brandt, Radomír Mech, and Mitchel Resnick. 2018. Extending Manual Drawing Practices with Artist-Centric Programming Tools. In Proceedings of the 2018 CHI Conference on Human Factors in Computing Systems (CHI '18). ACM, New York, NY, USA, Article 590, 13 pages. https://doi.org/10.1145/3173574.3174164.

Alexandre Kaspar, Boris Neubert, Dani Lischinski, Mark Pauly, and Johannes Kopf. 2015. Self Tuning Texture Optimization. Comput. Graph. Forum 34, 2 (May 2015), 349-359. https://doi.org/10.1111/cgf.12565.

Rubaiat Habib Kazi, Takeo Igarashi, Shengdong Zhao, and Richard Davis. 2012. Vignette: Interactive Texture Design and Manipulation with Freeform Gestures for Pen-and-ink Illustration. In CHI '12. 1727-1736. https://doi.org/10.1145/2207676.2208302.

Kin Chung Kwan, Lok Tsun Sinn, Chu Han, Tien-Tsin Wong, and Chi-Wing Fu. 2016. Pyramid of Arclength Descriptor for Generating Collage of Shapes. ACM Trans. Graph. 35, 6, Article 229 (Nov. 2016), 12 pages. https://doi.org/10.1145/2980179.2980234.

Vivek Kwatra, Irfan Essa, Aaron Bobick, and Nipun Kwatra. 2005. Texture Optimization for Example-based Synthesis. ACM Trans. Graph. 24, 3 (Jul. 2005), 795-802. https://doi.org/10.1145/1073204.1073263 1:10 · Anon. Submission Id: papers_204//doi.org/10.1145/1073204.1073263.

Pierre-Edouard Landes, Bruno Galerne, and Thomas Hurtut. 2013. A Shape-Aware Model for Discrete Texture Synthesis. Computer Graphics Forum 32, 4 (2013), 67-76.

Marius Leordeanu and Martial Hebert. 2005. A spectral technique for correspondence problems using pairwise constraints. In ICCV '05.

Muxingzi Li, Florent Lafarge, and Renaud Marlet. 2020. Approximating shapes in images with low-complexity polygons. In The IEEE/CVF Conference on Computer Vision and Pattern Recognition (CVPR).

Lifeng Liu and Stan Sclaroff. 2001. Region segmentation via deformable model-guided split and merge. In Proceedings Eighth IEEE International Conference on Computer Vision. ICCV 2001, vol. 1. IEEE, 98-104.

Yitzchak David Lockerman, Basile Sauvage, Rémi Allègre, Jean-Michel Dischler, Julie Dorsey, and Holly Rushmeier. 2016. Multiscale Label-map Extraction for Texture Synthesis. ACM Trans. Graph. 35, 4, Article 140 (Jul. 2016), 12 pages. https://doi.org/10.1145/2897824.2925964.

Hugo Loi, Thomas Hurtut, Romain Vergne, and Joelle Thollot. 2017. Programmable 2D Arrangements for Element Texture Design. ACM Trans. Graph. 36, 4, Article 105a (May 2017). https://doi.org/10.1145/3072959.2983617.

Jingwan Lu, Connelly Barnes, Stephen DiVerdi, and Adam Finkelstein. 2013. RealBrush: Painting with Examples of Physical Media. ACM Trans. Graph. 32, 4, Article 117 (Jul. 2013), 12 pages. https://doi.org/10.1145/2461912.2461998.

Jingwan Lu, Connelly Barnes, Connie Wan, Paul Asente, Radomir Mech, and Adam Finkelstein. 2014. DecoBrush: Drawing Structured Decorative Patterns by Example. ACM Trans. Graph. 33, 4, Article 90 (Jul. 2014), 9 pages. https://doi.org/10.1145/2601097.2601190.

Jingwan Lu, Fisher Yu, Adam Finkelstein, and Stephen DiVerdi. 2012. HelpingHand: Example-based Stroke Stylization. ACM Trans. Graph. 31, 4, Article 46 (Jul. 2012), 10 pages. https://doi.org/10.1145/2185520.2185542.

Chongyang Ma, Li-Yi Wei, Sylvain Lefebvre, and Xin Tong. 2013. Dynamic Element Textures. ACM Trans. Graph. 32, 4, Article 90 (Jul. 2013), 10 pages. https://doi.org/10.1145/2461912.2461921.

Chongyang Ma, Li-Yi Wei, and Xin Tong. 2011. Discrete Element Textures. ACM Trans. Graph. 30, 4, Article 62 (Jul. 2011), 10 pages. https://doi.org/10.1145/2010324.1964957.

Giacomo Nazzaro, Enrico Puppo, and Fabio Pellacini. 2020. DecoSurf: Recursive Geodesic Patterns on Triangle Meshes. arXiv:cs.GR/2007.10918.

(56) References Cited

PUBLICATIONS

Hans Pedersen and Karan Singh. 2006. Organic Labyrinths and Mazes. In NPAR '06. 79-86. https://doi.org/10.1145/1124728.1124742.

Brian Price and William Barrett. 2006. Object-based vectorization for interactive image editing. The Visual Computer 22, 9 (2006), 661-670.

Pradyumna Reddy, Paul Guerrero, Matt Fisher, Wilmot Li, and Niloy J. Mitra. 2020. Discovering Pattern Structure Using Differentiable Compositing.

Amir Rosenberger, Daniel Cohen-Or, and Dani Lischinski. 2009. Layered Shape Synthesis: Automatic Generation of Control Maps for Non-Stationary Textures. ACM Trans. Graph. 28, 5 (Dec. 2009), 1-9. https://doi.org/10.1145/1618452.1618453.

Riccardo Roveri, A Cengiz Öztireli, Sebastian Martin, Barbara Solenthaler, and Markus Gross. 2015. Example based repetitive structure synthesis. Computer Graphics Forum 34, 5 (2015), 39-52.

Christian Santoni and Fabio Pellacini. 2016. gTangle: A Grammar for the Procedural Generation of Tangle Patterns. ACM Trans. Graph. 35, 6, Article 182 (Nov. 2016), 11 pages. https://doi.org/10.1145/2980179.2982417.

Reza Adhitya Saputra, Craig S. Kaplan, and Paul Asente. 2020. AnimationPak: Packing Elements with Scripted Animations. In Graphics Interface '20. https://openreview.net/forum?id=sr89orrDo- o.

WWCRE Schapire and Yoram Singer. 1998. Learning to order things. Advances in Neural Information Processing Systems 10 (1998), 451.

Jianbo Shi and Jitendra Malik. 2000. Normalized cuts and image segmentation. IEEE Transactions on pattern analysis and machine intelligence 22, 8 (2000), 888-905.

Kenshi Takayama, Olga Sorkine, Andrew Nealen, and Takeo Igarashi. 2010. Volumetric Modeling with Diffusion Surfaces. In SIGGRAPH Asia '10. Article Article 180, 8 pages. https://doi.org/10.1145/1866158.1866202.

Jean-Marc Thiery, Émilie Guy, and Tamy Boubekeur. 2013. Sphere-Meshes: Shape Approximation Using Spherical Quadric Error Metrics. ACM Trans. Graph. 32, 6, Article 178 (Nov. 2013), 12 pages. https://doi.org/10.1145/2508363.2508384.

Peihan Tu, Li-Yi Wei, Koji Yatani, Takeo Igarashi, and Matthias Zwicker. 2020. Continuous Curve Textures. ACM Trans. Graph. 39, 6, Article 168 (Dec. 2020). Https://doi.org/10.1145/3414685.3417780.

W3. 2020. SVG Rendering Model. https://www.w3.org/TR/SVG/render.html. Date downloaded Sep. 27, 2021.

Lvdi Wang, Yizhou Yu, Kun Zhou, and Baining Guo. 2011. Multiscale vector vols. ACM Transactions on Graphics (TOG) 30, 6 (2011), 1-8.

Li-Yi Wei, Arjun V Anand, Shally Kumar, and Tarun Beri. 2020. Simple Methods to Represent Shapes with Sample Spheres. In SA '20 Technical Communications. Article 3, 4 pages. https://doi.org/10.1145/3410700.3425424.

Li-Yi Wei, Sylvain Lefebvre, Vivek Kwatra, and Greg Turk. 2009. State of the Art in Example-based Texture Synthesis. In Eurographics 2009, State of the Art Report, EG-STAR. Eurographics Association. http://www-sop.inria.fr/reves/Basilic/2009/ WLKT09.

Michael T Wong, Douglas E Zongker, and David H Salesin. 1998. Computer-generated floral ornament. In SIGGRAPH '98. 423-434.

Feng Zhou and Fernando De la Torre. 2012. Factorized graph matching. In 2012 IEEE Conference on Computer Vision and Pattern Recognition. IEEE, 127-134.

Kun Zhou, Xin Huang, Xi Wang, Yiying Tong, Mathieu Desbrun, Baining Guo, and Heung-Yeung Shum. 2006. Mesh Quilting for Geometric Texture Synthesis. ACM Trans. Graph. 25, 3 (Jul. 2006), 690-697. https://doi.org/10.1145/1141911.1141942.

Shizhe Zhou, Changyun Jiang, and Sylvain Lefebvre. 2014. Topology-constrained Synthesis of Vector Patterns. ACM Trans. Graph. 33, 6, Article 215 (Nov. 2014), 11 pages. https://doi.org/10.1145/2661229.2661238.

Yang Zhou, Zhen Zhu, Xiang Bai, Dani Lischinski, Daniel Cohen-Or, and Hui Huang. 2018. Non-Stationary Texture Synthesis by Adversarial Expansion. ACM Trans. Graph. 37, 4, Article 49 (Jul. 2018), 13 pages. https://doi.org/10.1145/3197517. 3201285.

Changqing Zou, Junjie Cao, Warunika Ranaweera, Ibraheem Alhashim, Ping Tan, Alla Sheffer, and Hao Zhang. 2016. Legible Compact Calligrams. ACM Trans. Graph. 35, 4, Article 122 (Jul. 2016), 12 pages. https://doi.org/10.1145/2897824.2925887.

* cited by examiner

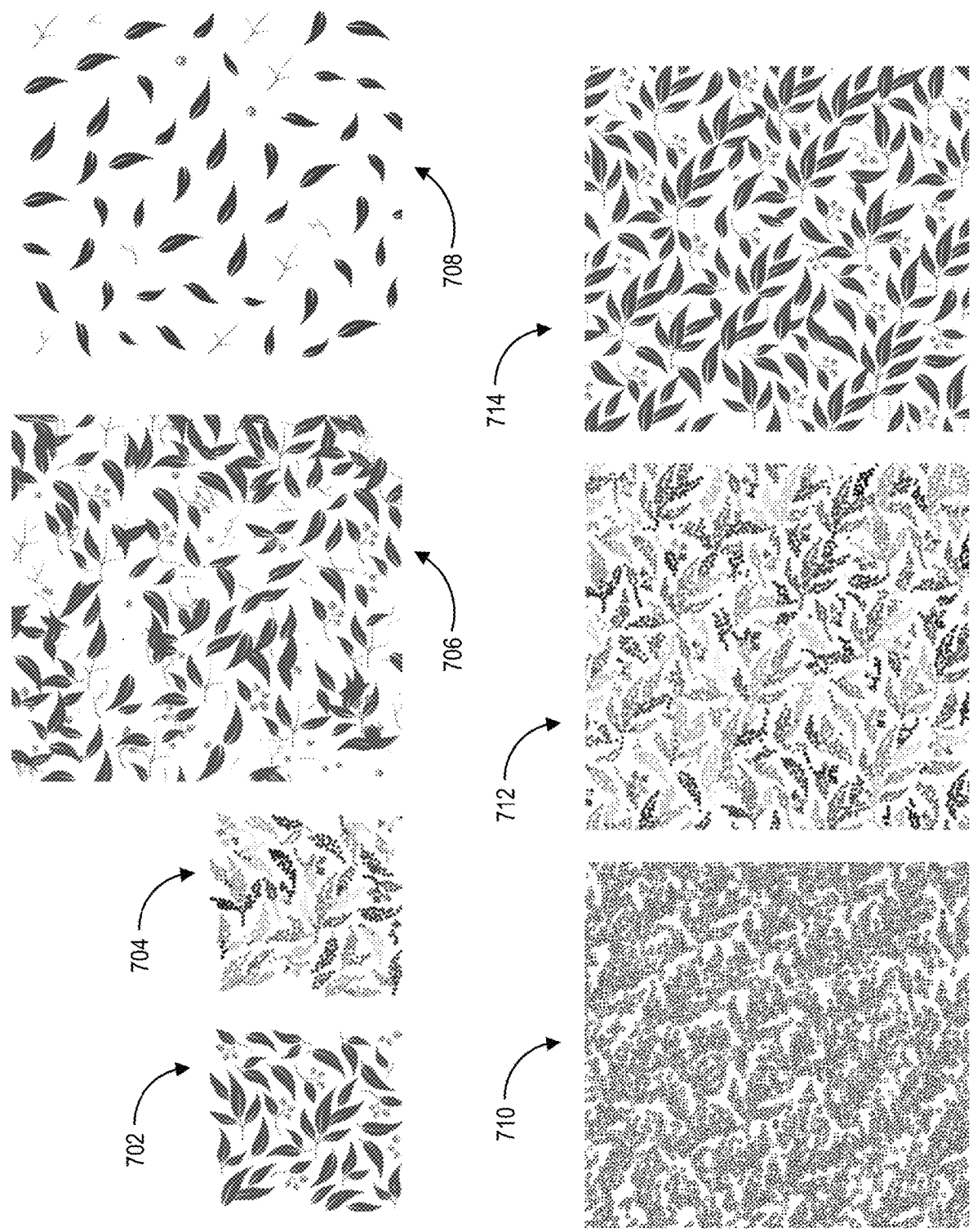

UTILIZING CLUSTERING TO SYNTHESIZE VECTOR PATTERNS IN DIGITAL IMAGES

BACKGROUND

Recent years have seen rapid development in digital image rendering technology. Indeed, due to advances in algorithms and hardware, conventional digital rendering systems are now able to synthesize vector patterns. Specifically, some existing systems are able to synthesize simple vector patterns. In other cases, existing systems rasterize a vector pattern, apply image texture synthesis, and vectorize the raster results of the image texture synthesis. Unfortunately, a number of problems exist with such conventional digital rendering systems. For instance, existing systems suffer from limited system functionality because existing systems are incapable of synthesizing complex vector patterns. Additionally, existing systems suffer from poor quality or reduced accuracy of synthesized vector patterns. In particular, existing systems often lose the original design of an input vector pattern by erroneously synthesizing vector patterns with incorrect structure between integral vector elements and/or between overlapping shapes in different depth layers. Further, existing systems often also require an inordinate amount of complex user interactions via a user interface to generate even simple vector patterns.

BRIEF SUMMARY

Embodiments of the present disclosure provide benefits and/or solve one or more of the foregoing or other problems in the art with systems, non-transitory computer-readable media, and methods that jointly synthesize and cluster sample distributions to produce clustered/segmented sample representations that facilitate robust optimization and reconstruction of output vector patterns. For example, given a vector input exemplar, the disclosed systems sample vector elements to generate an intermediate clustered representation of the vector input exemplar. Vector elements are represented as input clusters of samples. Then, in one or more embodiments, the disclosed systems use the input clusters to synthesize output clusters utilizing an optimization model. Subsequently, the disclosed systems reconstruct an output vector pattern of vector elements from the output clusters.

In so doing, the disclosed systems jointly optimize spatial distributions and cluster configurations. For example, as part of an approach implementing search-assign-clustering steps, the disclosed systems use a greedy algorithm to perform efficient neighborhood matching. As a further example, in the clustering step of the approach, the disclosed systems utilize a cluster energy function to measure the quality of output clusters by taking into account both the matched neighborhoods and cluster shapes. In certain implementations, the disclosed systems minimize the cluster energy function to generate optimal configurations of the output clusters.

Additional features and advantages of one or more embodiments of the present disclosure are outlined in the following description.

BRIEF DESCRIPTION OF THE DRAWINGS

The detailed description provides one or more embodiments with additional specificity and detail through the use of the accompanying drawings, as briefly described below.

FIG. 7 illustrates, in comparison to conventional systems, experimental results of implementing a vector cluster texturing system to synthesize a vector pattern in accordance with one or more embodiments.

DETAILED DESCRIPTION

Figure 1:
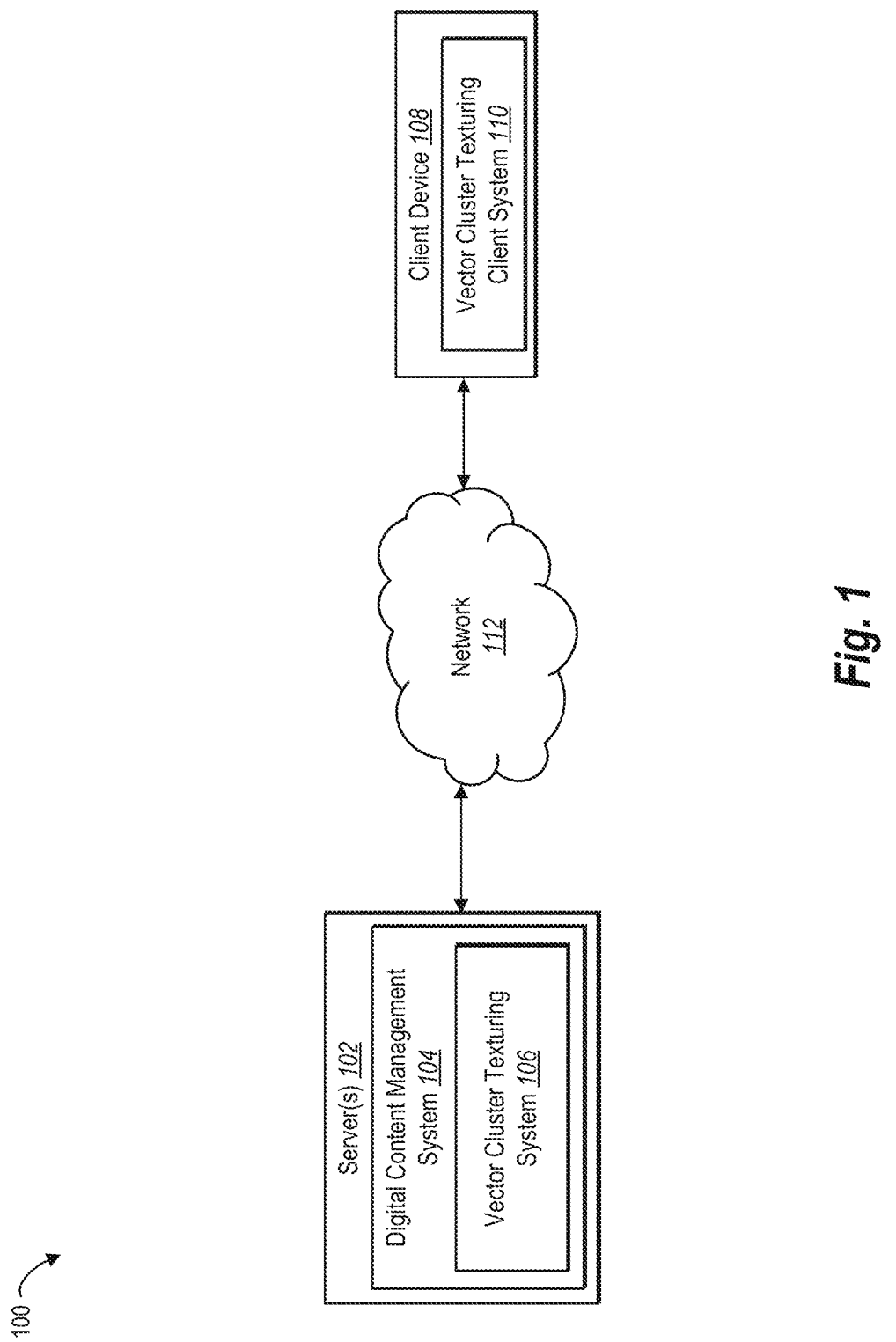
FIG. 1 illustrates a computing system environment for implementing a vector cluster texturing system in accordance with one or more embodiments.

One or more embodiments described herein include a vector cluster texturing system that utilizes cluster mapping to efficiently and accurately generate new vector images that preserve patterns/structures from input exemplar images. In particular embodiments, the vector cluster texturing system implements one or more algorithms for optimizing cluster configurations to generate complicated, structured vector patterns. Specifically, in certain implementations, the vector cluster texturing system uses these first-of-its-kind algorithms to jointly synthesize and cluster sample distributions to produce clustered or segmented sample representations for robust optimization and reconstruction of output vector patterns.

To illustrate, in one or more embodiments, the vector cluster texturing system samples data points from a vector image. Based on the data points, the vector cluster texturing system generates a clustered representation of vector elements that make up a vector pattern in the vector image. In turn, the vector cluster texturing system uses an optimization model to synthesize output clusters in a manner that maintains the structural relationships among vector elements in the vector image. Using the output clusters, the vector cluster texturing system synthesizes vector elements for creating a new vector image with a synthetic version of the vector pattern.

As alluded to above, in one or more embodiments, the vector cluster texturing system samples data points from an input vector image. For example, the vector cluster texturing system samples data points in the input vector image utilizing one or more sampling algorithms. Additionally, in certain implementations, the vector cluster texturing system samples the vector elements over multiple hierarchical sampling iterations with varying (e.g., increasing or denser) sample distributions per hierarchy.

In one or more embodiments, the vector cluster texturing system determines input clusters based on the sampled data points. For example, the vector cluster texturing system deduces the input clusters from the input vector image by identifying respective data points grouped together in a manner that spatially corresponds to vector elements of the input vector image. Additionally or alternatively, in certain embodiments, the vector cluster texturing system determines (or modifies) the input clusters based on user interactions via a graphical user interface to group, split, or remove vector elements in the input vector image.

In certain implementations, the vector cluster texturing system then uses the input clusters to initialize an output domain for generating a synthetic vector pattern in a new vector image. For instance, the vector cluster texturing system randomly copies input patches from the input vector image into the output domain. In other instances, the vector cluster texturing system uses random sample initialization.

After initialization of the output domain, in particular embodiments, the vector cluster texturing system implements an iterative search-assign-clustering approach to efficiently and accurately generate a synthetic version of the vector pattern portrayed in the input vector image. To illustrate, the search step involves the vector cluster texturing system searching for a sample data point corresponding to a sample neighborhood most similar to a synthetic neighborhood of a synthetic data point in the output domain. Accordingly, in one or more embodiments, the vector cluster texturing system determines neighborhood matching pairs based on neighborhood similarity. To do so, the vector cluster texturing system implements a greedy strategy that includes decomposing the quadratic neighborhood matching process into the following substeps: (i) matching sample data points and synthetic data points independent of cluster identifiers; (ii) matching cluster identifiers between neighborhoods by matching cluster identifiers for sample data points corresponding to input clusters and cluster identifiers for synthetic data points corresponding to output clusters; and (iii) matching sample data points to synthetic data points utilizing matched cluster identifiers.

In one or more embodiments of the assignment step, the vector cluster texturing system assigns spatial parameters and appearance parameters to the synthetic data points. For example, the vector cluster texturing system determines and assigns position parameters and z-index (depth) values to the synthetic data points. Similarly, for example, the vector cluster texturing system determines and assigns at least one of color values, opacity values, or gradient values to the synthetic data points (e.g., utilizing a voting scheme).

In certain implementations of the clustering step, the vector cluster texturing system utilizes a greedy, energy-optimization function based on link energies and shape energies. In one or more embodiments, the link energy measures the link (or level of affinity) between two clusters. If the link energy between two output clusters is high, this suggests some synthetic data points from one output cluster might belong to the other output cluster, the two output clusters could be merged together, or at least one of the clusters should not be split into separate clusters. Further, in one or more embodiments, the shape energy measures the differences between shapes of output clusters and shapes of corresponding input clusters. A large shape energy indicates that the shape of an output cluster is dissimilar to the shape of a corresponding input cluster.

In certain embodiments, the vector cluster texturing system optimizes the greedy, energy-optimization function based on link energies and shape energies by utilizing a processing queue of cluster operations. Example cluster operations include switching boundary data points between output clusters, merging a pair of adjacent output clusters, and splitting a cluster into two or more separate output clusters. In one or more embodiments, the vector cluster texturing system prioritizes cluster operations within the processing queue based on energy reduction (e.g., shape energy reduction and link energy reduction). Subsequently, the vector cluster texturing system performs a prioritized cluster operation and updates the processing queue. In particular embodiments, the vector cluster texturing system iteratively performs cluster operations according to the processing queue until achieving a max iteration threshold. Additionally, or alternatively, the vector cluster texturing system iteratively performs cluster operations according to the processing queue until at least one of the shape energies or the link energies is not reduced, or in certain embodiments, until the sum of the shape energies and the link energies is not reduced.

In one or more embodiments, the vector cluster texturing system iteratively performs the search-assign-clustering steps just described within each sampling hierarchy. For example, the vector cluster texturing system performs multiple (e.g., about five to about ten) iterations of the search-assign-clustering within a first sampling hierarchy, multiple iterations of the search-assign-clustering within a second sampling hierarchy, and so forth for each sampling hierarchy. In particular embodiments, the vector cluster texturing system uses increasingly higher sampling rates for each subsequent sampling hierarchy (e.g., to increasingly refine the output clusters).

In particular embodiments, the vector cluster texturing system generates a new vector image by reconstructing additional vector elements that spatially correspond to the output clusters. The new vector image includes a synthetic version of the vector pattern from the input vector image. Moreover, the synthetic vector pattern composed of the additional vector elements maintains the same structural relationships from the vector pattern in the input vector image.

Additionally, the vector cluster texturing system generates the new vector image in vector format to facilitate user editing or customization as may be desired. Accordingly, in one or more embodiments, the vector cluster texturing system modifies the new vector image in response to user interactions with the new vector image. For example, the vector cluster texturing system modifies the new vector image in response to identifying, via a user interface, one or more user interactions to rearrange one or more of the additional vector elements, add a new additional vector element, or remove one or more of the additional vector elements.

Additional or alternative embodiments include using a machine-learning model together with hierarchical synthesis (e.g., for vector patterns with global structures). Further, in certain implementations, the vector cluster texturing system modifies sampling/representation approaches based on size and/or shape of vector elements. For example, the vector cluster texturing system utilizes central skeletal paths to sample extra-elongated vector elements.

In addition, it will be appreciated that elements of this disclosure may be applied to a variety of different applications in addition to (or alternatively to) vector pattern synthesis. For example, the vector cluster texturing system can implement elements of this disclosure to perform pattern interpolation, animated patterns, or three-dimensional volumes. Additionally, for example, the vector cluster texturing system implements a variety of user controls to integrate enhanced user-editing of synthetic vector patterns.

Furthermore, in one or more embodiments, the vector cluster texturing system performs the search step in a parallelized manner on a graphics processing unit (GPU) of an implementing computing device. Certain processing approaches—like parallelized GPU processing—reduces the number of needed samples and improves runtime speed.

As mentioned above, a number of problems exist with existing digital rendering systems or existing digital image editing systems (hereinafter "conventional systems"). For example, conventional systems are generally incapable of synthesizing complex vector patterns. To illustrate, conventional systems in vector element synthesis and vector curve synthesis are largely limited to reconstructing curves from graphs (e.g., to generate Bézier curve patterns). Accordingly, conventional systems using these approaches are unable to generate varied structure patterns that have elements other than open Bézier curves. Indeed, conventional systems are often limited to synthesizing simple, unstructured patterns or non-diverse geometries such as discrete elements and continuous Bézier curves typically provided by users. Some conventional systems that implement procedural approaches are able to produce more complex outcomes, such as packed elements or structured patterns. However, such systems implementing these procedural approaches are fundamentally limited by the underlying grammars or procedures. Moreover, the approaches of conventional systems to implement these or other methods are slow, sensitive to outliers, and therefore unsuitable for most applications. As a result, conventional systems suffer from limited functionality.

In addition, conventional systems suffer from poor quality or reduced accuracy of synthesized vector patterns. To illustrate, some conventional systems rasterize a vector pattern, apply image texture synthesis, and then vectorize the raster results of the image texture synthesis. Under this approach, conventional systems often end up generating broken or merged patterns. That is, by rasterizing, synthesizing, and then vectorizing, conventional systems tend to lose the original design of an input vector pattern. For instance, conventional systems erroneously synthesize vector patterns with incorrect structure between integral vector elements and/or between overlapping shapes in different depth layers. As a result, conventional systems often generate inaccurate or poor quality vector patterns with visually noticeable errors.

Further, conventional systems may also require an inordinate amount of complex user interactions via a user interface to generate even the simplest of vector patterns. To illustrate, typical user interface operations of conventional systems involve excessive trial and error to preserve shape details and remedy (or remove) artifacts. For instance, some conventional systems process numerous user inputs via custom brushes or widgets to fix merged or broken patterns, fill missing patches, correct color distortions, rectify structural errors, and/or alter layer relationships. Accordingly, conventional systems implement complex user interfaces that are both unfriendly to users and inefficient from an input-processing standpoint.

In contrast, the vector cluster texturing system provides a number of benefits over conventional systems. For example, unlike conventional systems, the vector cluster texturing system provides increased system flexibility to generate complex vector patterns that maintain structural relationships and shape details from an exemplar vector image. Indeed, by utilizing an optimization model to cluster synthetic data points, the vector cluster texturing system more robustly and more efficiently generates synthetic versions of numerous kinds of vector patterns. By extending system functionality beyond simple patterns (e.g., discrete elements or continuous structures), implementing computing devices are able to synthesize combinations of both simple and complex vector patterns using the vector cluster texturing system.

In addition, the vector cluster texturing system improves the quality and/or accuracy of synthesized vector patterns. For example, unlike conventional systems, the vector cluster texturing system does not merge or break patterns in response to synthesizing complex vector patterns. Rather, the vector cluster texturing system maintains structural relationships and shape details by synthesizing vector elements for a new vector image in a way that accounts for clusters. Specifically, the vector cluster texturing system uses cluster identifiers in neighborhood matching and cluster operations to optimize cluster configurations based on link energies and shape energies to reconstruct more accurate and more consistent vector patterns.

Further, in one or more embodiments, the vector cluster texturing system provides a more efficient, streamlined user interface for generating complex vector patterns. For example, unlike conventional systems, the vector cluster texturing system conserves computer resources by avoiding the costs of processing an inordinate amount of user inputs (or coarse user guidance/control inputs) to generate or modify a vector pattern. Instead, the vector cluster texturing system utilizes an automated approach based on cluster optimization over iterative search-assign-clustering steps. Moreover, the vector cluster texturing system utilizes hierarchical sampling to iteratively refine clusters and better preserve shape details and structural relationships—all without user input. However, if a user prefers, the vector cluster texturing system is able to modify a new vector image by adding, removing, or altering vector elements according to intuitive user inputs via a user interface.

As illustrated by the foregoing discussion, the present disclosure utilizes a variety of terms to describe features and benefits of the vector cluster texturing system. Additional detail is now provided regarding the meaning of these terms. For example, as used herein, the term "vector pattern" refers to an arrangement of vector graphics in a digital image. In particular embodiments, a vector pattern includes an arrangement of vector elements defined in terms of points on a plane (e.g., a Cartesian plane). Examples of a vector pattern include arrangements of vector elements included within vector images (e.g., scalable vector graphic (SVG) images, portable document format (PDF) images, or Adobe Illustrator (AI) files). Relatedly, the term "vector elements" refers to vector-based, graphical objects that form lines, polylines, Bézier curves, bezigons, polygons, splines, and/or other shapes, composites, or graphical entities in a vector format.

As also used herein, the terms "vector structures" or "structures" refers to parameterized relationships that define how vector elements relate to each other or to a vector image. In particular embodiments, structures include (or define) connections or touchpoints between two or more vector elements, overlap or layering of vector elements, etc. In certain embodiments, structures include spatial parameters such as position and z-index (depth) values. Additionally or alternatively, structures include appearance attributes such as color values, opacity values, or gradient values.

Additionally, as used herein, the term "data points" refers to one or more digital samples corresponding to a digital image. In particular embodiments, a data point includes a sample data point (e.g., actual vector data point sampled from a vector image). In other embodiments, a data point includes a synthetic data point (e.g., a duplicated version or a modified version of a sampling data point). Sample data points correspond to exemplars (e.g., input vector images). In contrast, synthetic data points correspond to new vector images generated based on exemplars. Moreover, data points include, define, or be assigned certain parameters such as cluster identifier, spatial parameters (e.g., a vector position or z-index (depth) value), or appearance attributes (e.g., color values, opacity values, gradient values).

As also used herein, the term "cluster" refers to a grouping of data points. In particular embodiments, a cluster include comprises an input cluster (e.g., a group of sample data points) or an output cluster (e.g., a group of synthetic data points). Relatedly, the term "cluster identifier" refers to an alphanumeric representation of a specific cluster. In particular embodiments, a cluster identifier indicates, for a data point, which cluster of data points the data point corresponds to.

Additionally, as used herein, the term "optimization model" refers to one or more algorithms or objective functions to determine an optimized value. Examples of one or more optimization models include a neighborhood matching optimization model, a cluster optimization model based on link energies and shape energies, and a cluster operation optimization model based on energy reduction. It will be appreciated that the term "optimize" as used in this disclosure is not limited to specific interpretations. The term optimize refers to improved, enhanced, or local optima. Indeed, the term optimize does necessarily refer to absolute optima, true optimization, or a best value (e.g., a maximum value or a minimum value). However, in certain instances, the term optimize includes such absolute optima, maximum values, minimum values, etc. To illustrate, the vector cluster texturing system determines an optimal configuration of output clusters that minimize shape energies and link energies of clusters via at least one of the cluster optimization model or the cluster operation optimization model.

Further, as used herein, the term "neighborhood" refers to a set of data points within a certain vicinity. In particular embodiments, a neighborhood includes a sample neighborhood (e.g., a set of sample data points positioned within a certain radius) and a synthetic neighborhood (e.g., a set of synthetic data points positioned within a certain radius).

Relatedly, the term "neighborhood similarity" refers to a quantitative measure of similarity between neighborhoods. In particular embodiments, neighborhood similarity includes a measure of similarity based on individual data points and a measure of similarity based on pairs of data points. For example, neighborhood similarity is composed of unary sample similarities, pairwise sample similarities, and induced costs (e.g., matching costs that correspond to one or more synthetic data points unmatched to one or more sample data points).

The term "unary sample similarities" refers to measures of similarity between individual data points. In particular embodiments, unary sample similarities include a comparison of properties for sample data points and properties for synthetic data points in respective neighborhoods. For example, unary sample similarities include a weighted sum of differences between spatial parameters of sample data points and synthetic data points in respective neighborhoods. As another example, unary sample similarities include a weighted sum of differences between appearance attributes of sample data points and synthetic data points in respective neighborhoods.

The term "pairwise sample similarities" refers to measures of similarity between pairs of data points. In particular embodiments, pairwise sample similarities include a comparison of cluster identifiers for sample data points and cluster identifiers for synthetic data points in data point pairings. To illustrate, a pairwise sample similarity between one pair of sample data points and one pair of synthetic data points may go to zero based on the pair of sample data points sharing a same cluster identifier and the pair of synthetic data points sharing a same cluster identifier. In contrast, a pairwise sample similarity between another pair of sample data points and another pair of synthetic data points may equate to a predetermined/weighted factor based on the pair of sample data points sharing a same cluster identifier and the pair of synthetic data points not sharing a same cluster identifier (or vice-versa).

Further, as used herein, the term "link energies" refers to measures of affinity between clusters. In particular embodiments, a link energy is based on a link confidence (e.g., a probability that adjacent synthetic data points correspond to a same cluster). In certain implementations, a higher link energy between first and second output clusters indicates that some synthetic data points from the first output cluster might belong to the second output cluster, the first and second output clusters could be merged together, or at least one of the first or second clusters should not be split into separate clusters.

In addition, as used herein, the term "shape energies" refers to difference measurements between a shape of an output cluster and a shape of an input cluster. In particular embodiments, shape energies are based on shape distances (e.g., distances between an input cluster and an output cluster). In certain implementations, shape energies are based on translation distances (e.g., distances to translate sample data points of input clusters to the positions synthetic data points of output clusters).

As also used herein, the term "processing queue" refers to a memory device or storage space configured to store computer-executable operations. In particular embodiments, a processing queue stores an ordered sequence of cluster operations. For example, a processing queue stores an ordered sequence of cluster operations based on an amount of energy reduction for at least one of link energies or a shape energies between clusters. In certain implementations, a processing queue iteratively updates an order sequence of cluster operations to reflect performance of cluster operation.

In addition, as used herein, the term "cluster operations" refers to computer-executable acts to define (or redefine) clusters and/or corresponding data points. For example, a cluster operation includes at least one of: switching a synthetic data point from a first output cluster to a second output cluster; merging two or more separate output clusters together; or splitting an output cluster into two or more separate output clusters.

As used herein, the term "sampling" refers to determining a data point distribution in relation to a vector image. In particular embodiments, sampling refers to sampling vector elements within a vector image. For example, sampling includes hierarchical sampling with denser sample distributions in subsequent hierarchy levels.

Additional detail will now be provided regarding the vector cluster texturing system in relation to illustrative figures portraying example embodiments and implementations of the vector cluster texturing system. For example, FIG. 1 illustrates a computing system environment (or "environment") 100 for implementing a vector cluster texturing system 106 in accordance with one or more embodiments. As shown in FIG. 1, the environment 100 includes server(s) 102, a client device 108, and a network 112. Each of the components of the environment 100 communicate (or are at least configured to communicate) via the network 112, and the network 112 may be any suitable network over which computing devices are able to communicate. Example networks are discussed in more detail below in relation to FIG. 13.

As further illustrated in FIG. 1, the environment 100 includes the server(s) 102. In particular embodiments, the server(s) 102 comprises a content server and/or a data collection server. Additionally or alternatively, the server(s) 102 comprise an application server, a communication server, a web-hosting server, a social networking server, or a digital content management server.

Moreover, as shown in FIG. 1, the server(s) 102 implement a digital content management system 104 that manages digital files (e.g., vector images or vector patterns for transmission, rendering, or storage). For example, in one or more embodiments, the digital content management system 104 receives, organizes, stores, updates, and/or transmits vector images to process and/or provide for display. For instance, in certain implementations, the digital content management system 104 comprises a data store of vector images available for user selection.

The vector cluster texturing system 106 efficiently generates new vector images with complex vector patterns. To illustrate, in one or more embodiments, the vector cluster texturing system 106 samples data points from a vector image that includes a vector pattern. Subsequently, the vector cluster texturing system 106 determines input clusters from the data points. In certain implementations, the input clusters spatially correspond to vector elements of the vector pattern. In turn, the vector cluster texturing system 106 uses an optimization model to synthesize output clusters of synthetic data points. In one or more embodiments, the synthetic data points are spatially arranged to correspond to additional vector elements that maintain structures of the vector elements of the vector pattern. The vector cluster texturing system 106 then generates a new vector image that includes a synthetic version of the vector pattern by digitally reconstructing the additional vector elements based on the output clusters.

As shown in FIG. 1, the environment 100 includes the client device 108. The client device 108 includes one of a variety of computing devices, including a smartphone, tablet, smart television, desktop computer, laptop computer, virtual reality device, augmented reality device, or other computing device as described in relation to FIG. 13. Although FIG. 1 illustrates a single client device 108, in particular embodiments the environment 100 includes multiple client devices 108. In these or other embodiments, the client device 108 further communicates with the server(s) 102 via the network 112. For example, the client device 108 receives user input and provides information pertaining to accessing, viewing, modifying, and/or interacting with a vector image to the server(s) 102.

As shown, the client device 108 includes a vector cluster texturing client system 110. In particular embodiments, the vector cluster texturing client system 110 comprises a web application, a native application installed on the client device 108 (e.g., a mobile application, a desktop application, etc.), or a cloud-based application where part of the functionality is performed by the server(s) 102. In certain embodiments, the vector cluster texturing client system 110 presents or displays information to a user associated with the client device 108, including vector images comprising a synthetic version of a vector pattern based on output clusters.

In additional or alternative embodiments, the vector cluster texturing client system 110 represents and/or provides the same or similar functionality as described herein in connection with the vector cluster texturing system 106. In some implementations, the vector cluster texturing client system 110 supports the vector cluster texturing system 106 on the server(s) 102. Indeed, in one or more embodiments, the client device 108 includes all, or a portion of, the vector cluster texturing system 106.

In one or more embodiments, though not illustrated in FIG. 1, the environment 100 has a different arrangement of components and/or has a different number or set of components altogether. For example, in certain embodiments, the environment 100 includes a third-party server (e.g., for storing vector images or other data). As another example, the client device 108 bypasses the network 112 and communicates directly with the server(s) 102.

As mentioned above, the vector cluster texturing system 106 more efficiently and more accurately generates complex vector patterns compared to conventional systems. To do so, the vector cluster texturing system 106 performs certain acts that generally include identifying a vector image, sampling data points from the vector image, and determining input clusters from the sample data points. In addition, the vector cluster texturing system 106 uses an optimization algorithm to synthesize output clusters based on the input clusters and generates a new vector image. In accordance with one or more such embodiments, FIGS. 2A-2B illustrate the vector cluster texturing system 106 generating a new vector image.

Figure 2A:
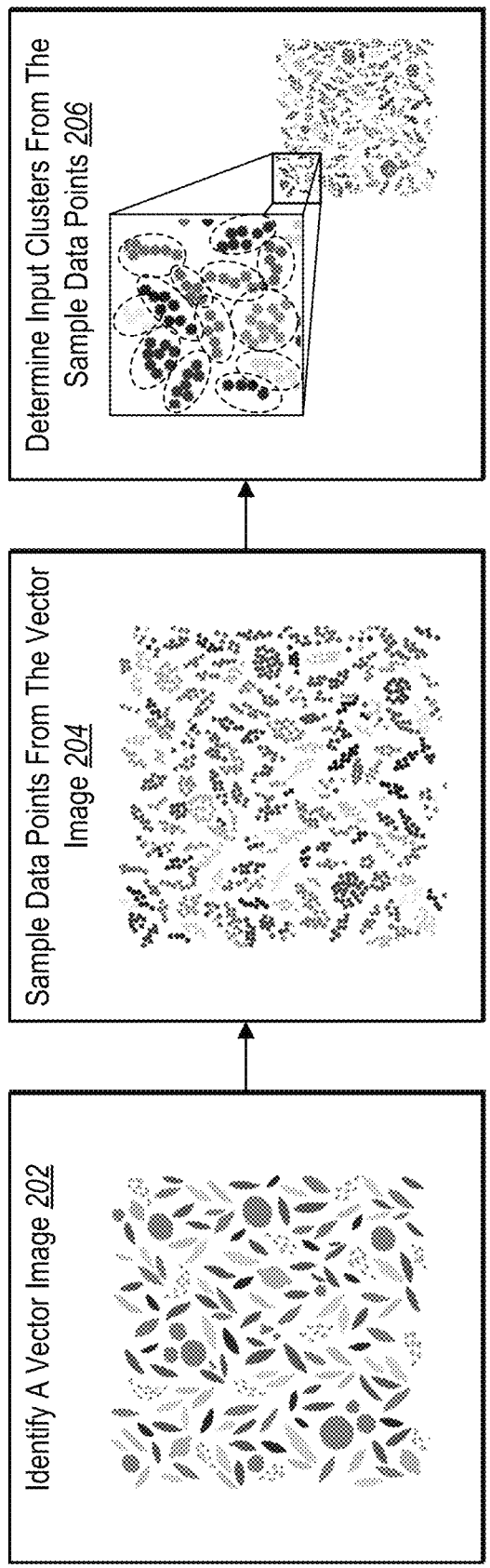
FIGS. 2A-2B illustrate a vector cluster texturing system generating a new vector image in accordance with one or more embodiments.
Figure 2B:
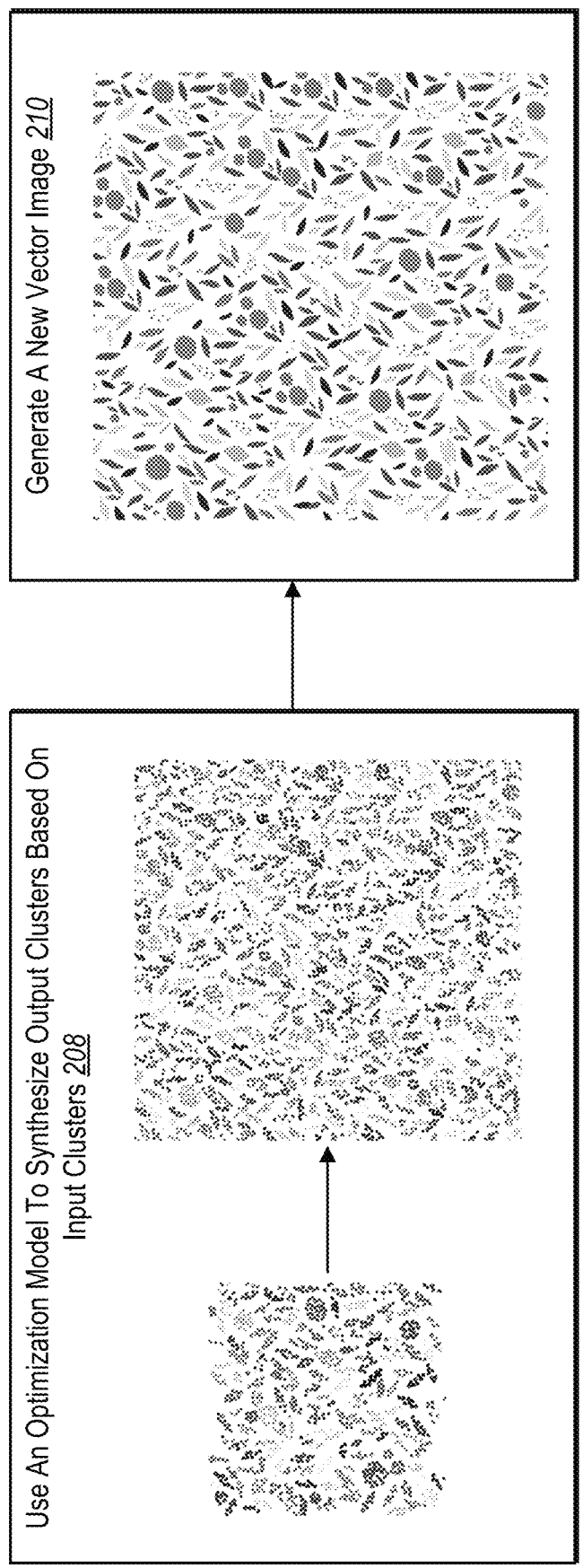

In FIG. 2A, at act 202, the vector cluster texturing system 106 identifies a vector image. In one or more embodiments, the vector cluster texturing system 106 identifies the vector image as an input image or exemplar in vector format. For example, the vector cluster texturing system 106 receives the vector image as an SVG file that comprises one or more vector elements. In certain implementations, the vector images includes a complex vector pattern of many different vector elements and a variety of corresponding structures.

At act 204, the vector cluster texturing system 106 samples data points from the vector image. In particular embodiments, the vector cluster texturing system 106 samples the vector elements to generate a data point distribution of the vector pattern. As described in more detail below, the vector cluster texturing system 106 utilizes one or more sampling algorithms. For example, in certain implementations, the vector cluster texturing system 106 uses a Poisson disk distribution algorithm to generate a uniform data point distribution. Moreover, in one or more embodiments, the vector cluster texturing system 106 uses hierarchical sampling. Via hierarchical sampling, the vector cluster texturing system 106 implements multiple hierarchy levels of sampling with increasingly denser sampling distributions per hierarchy level. In this manner, the vector cluster texturing system 106 increasingly refines and preserves shape details over multiple iterations and higher resolution sampling.

At act 206, the vector cluster texturing system 106 determines input clusters from the sample data points. In one or more embodiments, the vector cluster texturing system 106 determines the input clusters by identifying which sample data points group together in a manner that spatially corresponds to vector elements of the input vector image. For example, the vector cluster texturing system 106 uses vector paths of vector elements to determine groupings of sample data points that fall on or within corresponding vector paths of vector elements. However, it will be appreciated that, in certain implementations, clusters only indicate which sample data points are grouped together. Accordingly, clusters (e.g., input clusters and output clusters) do not necessarily identify or indicate specific vector elements.

Additionally or alternatively, in certain embodiments, the vector cluster texturing system 106 determines (or modifies) the input clusters based on user interactions that impart user-design intentions via a graphical user interface. For example, the vector cluster texturing system 106 forms, combines, splits, or removes clusters (and respective data points) in response to corresponding user inputs with respect to vector elements, clusters, and/or data points.

In FIG. 2B, at act 208, the vector cluster texturing system 106 uses an optimization model to synthesize output clusters based on the input clusters. In one or more embodiments, the vector cluster texturing system 106 uses an optimization model comprising a greedy strategy to efficiently estimate a neighborhood similarity function that adds neighborhood relationship information of cluster identifiers (e.g., to match sample neighborhoods and synthetic neighborhoods). The vector cluster texturing system 106 uses the matched neighborhoods as part of an iterative search-assign-clustering optimization. Specifically, in certain implementations, the vector cluster texturing system 106 further uses an optimization model that implements a greedy, energy-optimization function based on link energies and shape energies between clusters. Under this approach, the vector cluster texturing system 106 generates output clusters based on a large solution space but without brute-force analyses of all possible output cluster configurations.

At act 210, the vector cluster texturing system 106 generates a new vector image. In particular embodiments, the vector cluster texturing system 106 reconstructs additional vector elements that spatially correspond to the output clusters. For example, the vector cluster texturing system 106 translates a subset of vector elements from the vector image to populate the additional vector elements of the new vector image. In certain embodiments, the subset of vector elements corresponds to one or more input clusters that have a minimized shape energy with one or more output clusters corresponding to the additional vector elements.

As discussed above, the vector cluster texturing system 106 implements a sample-based neighborhood optimization framework by matching sample neighborhoods and synthetic neighborhoods. To do so, the vector cluster texturing system 106 determines neighborhood similarity terms that include unary sample similarities, matching costs, and pairwise sample similarities. In turn, the vector cluster texturing system 106 approximates a neighborhood similarity function that accounts for the extra neighborhood relationship information of cluster identifiers by: (i) matching sample data points and synthetic data points independent of cluster identifiers; (ii) matching cluster identifiers between neighborhoods by matching cluster identifiers corresponding to input clusters and cluster identifiers corresponding to output clusters; and (iii) matching sample data points to synthetic data points utilizing matched cluster identifiers. In accordance with one or more such embodiments, FIGS. 3A-3B illustrate the vector cluster texturing system 106 matching sample neighborhoods and synthetic neighborhoods.

Figure 3A:
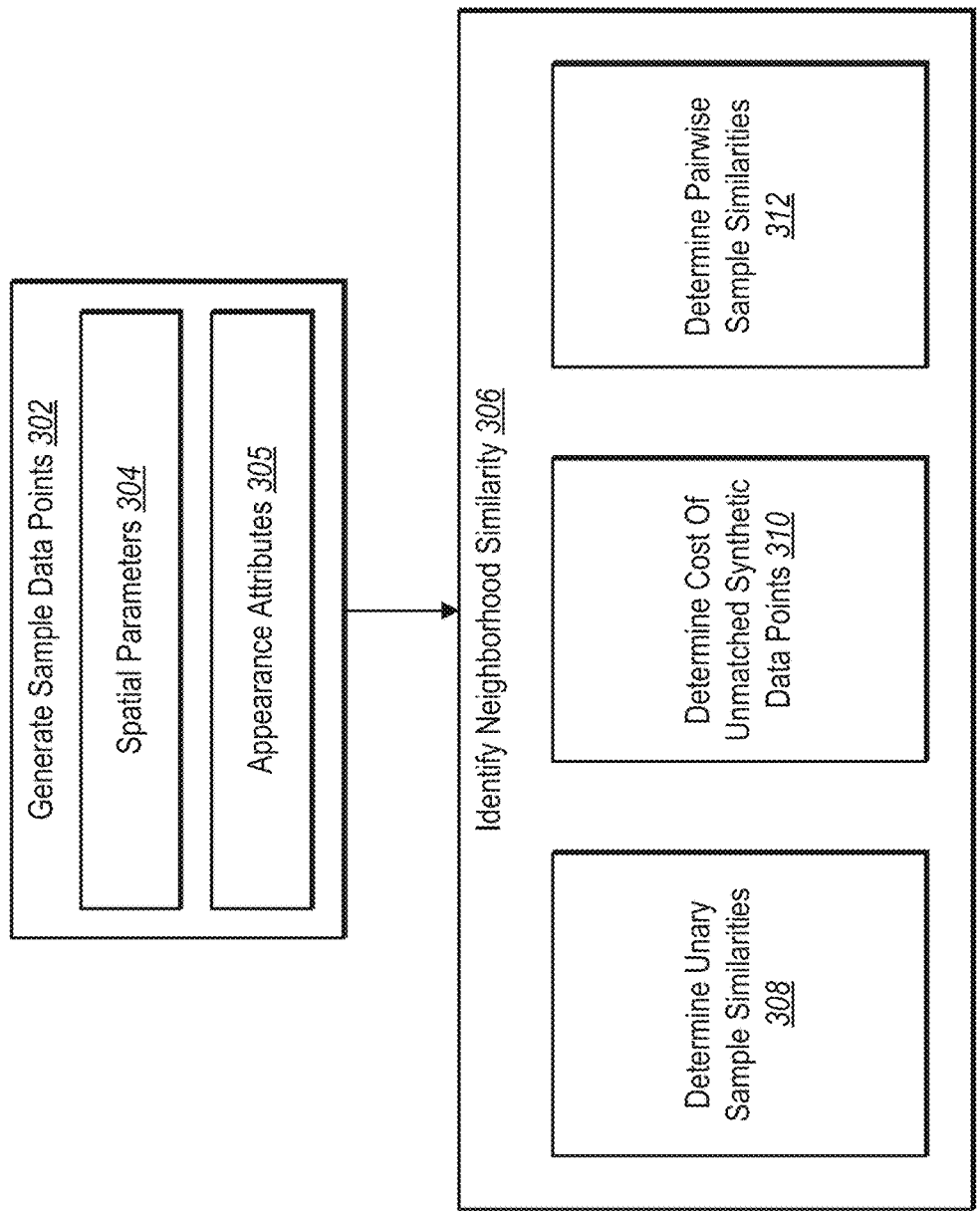
FIGS. 3A-3B illustrate a vector cluster texturing system matching sample neighborhoods and synthetic neighborhoods in accordance with one or more embodiments.
Figure 3B:
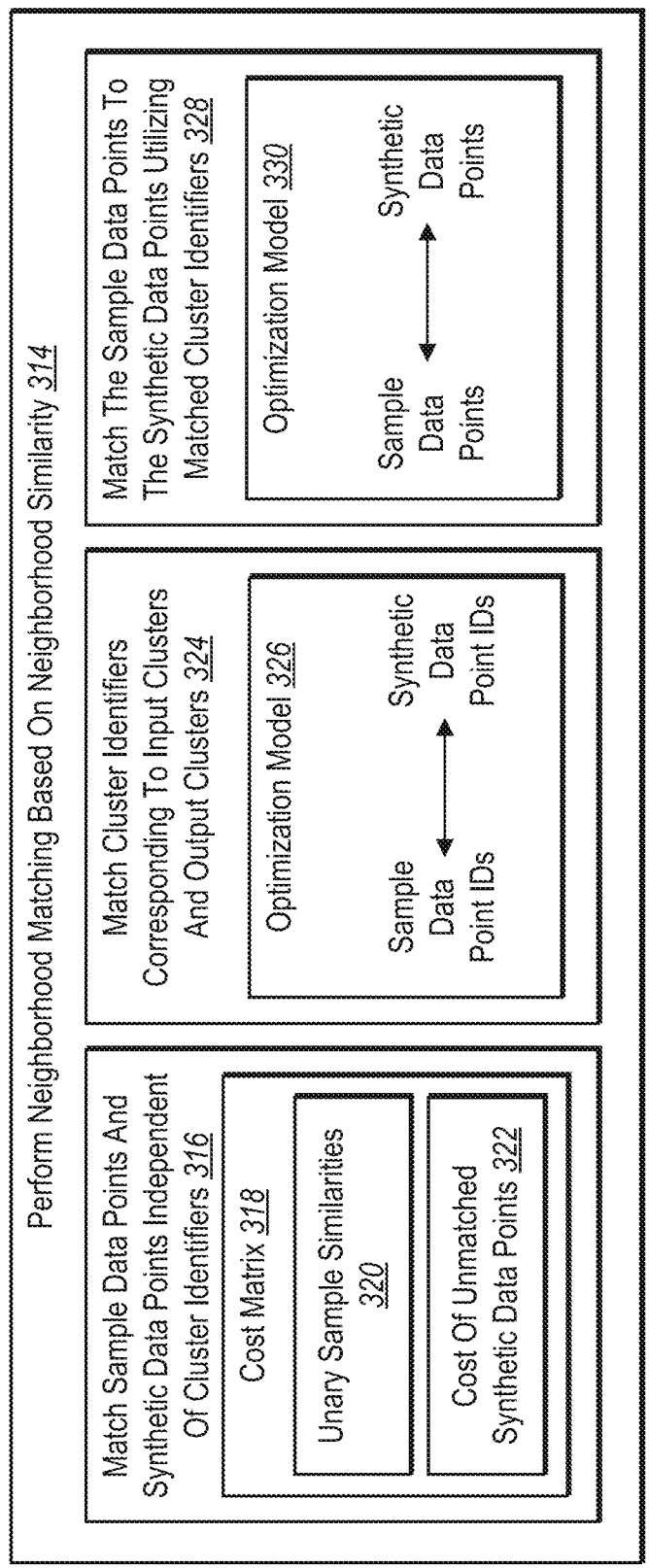

In FIG. 3A, at act 302, the vector cluster texturing system 106 generates sample data points. In one or more embodiments, the vector cluster texturing system 106 generates a distribution of sample data points. Different sampling algorithms generate different distributions. Accordingly, the vector cluster texturing system 106 may implement one or more sampling algorithms based on a desired result. In certain implementations, however, the vector cluster texturing system 106 uses a Poisson disk distribution algorithm to generate a uniform distribution of sample data points. Specifically, in one or more embodiments, the vector cluster texturing system 106 uses a disk diameter $\delta$. In some instances, the vector cluster texturing system 106 uses a disk diameter $\delta$ of $\frac{1}{20}$, $\frac{1}{30}$, or $\frac{1}{40}$ of the size of the vector image. It will be appreciated, however, that the vector cluster texturing system 106 is able to implement other suitable sampling algorithms (e.g., that reduce the number of needed sample data points and/or preserve more shape details).

In certain embodiments, the vector cluster texturing system 106 implements an intermediate clustered representation of a vector pattern by representing each vector element of the vector pattern in the vector image based on a cluster of sample data points. Additionally, or alternatively, in one or more embodiments, the vector cluster texturing system 106 uses hierarchical sampling. For example, the vector cluster texturing system 106 generates sample data points over multiple hierarchical sampling iterations or levels with varying (e.g., increasing or denser) sample distributions with smaller sampling distances $\delta$ per subsequent hierarchy level. In certain implementations, the vector cluster texturing system 106 uses two sampling hierarchy levels, three sampling hierarchy levels, or in some cases, four or more sampling hierarchy levels. Therefore, based on the hierarchical sampling of the input, the vector cluster texturing system 106 can synthesize the output in a hierarchical fashion (e.g., from coarse to fine). In this manner, the vector cluster texturing system 106 iteratively refines clusters and better preserves shape details and structural relationships.

Based on sampling, the vector cluster texturing system 106 optionally determines spatial parameters 304 and appearance attributes 305. That is, each sample data point comprises (or records) one or more spatial parameters and one or more appearance attributes that are specific to the particular sample data point. Thus, the vector cluster texturing system 106 represents a sample data point according to function (1) as follows:

$$U(s)=(S(s),A(s)) \tag{1}$$

where the term $U(s)$ represents a given sample's properties, the term $S(s)$ represents a given sample's spatial properties, and the term $A(s)$ represents a given sample's appearance attributes.

To illustrate, the spatial parameters 304 include various elements that define various elements of a data point position, such as an absolute position within the vector image or positioning relative to other data points. For example, the spatial parameters 304 include a position $p \in \mathbb{R}^2$ that defines a vector position according to a Cartesian plane of X-dimensions by Y-dimensions (e.g., width and height) for the vector image. Additionally, for example, the spatial parameters 304 include a cluster identifier $i \in \mathbb{Z}^+$ that indicates the cluster C to which the data point belongs (or likely belongs). In certain implementations, the spatial parameters 304 further includes a confidence of sample existence to optimize the number of samples. Additionally or alternatively, the spatial parameters 304 include a z-index (or depth) value $z \in \mathbb{Z}^+$ that indicates, for a given data point, an order of a corresponding vector element appearing in the vector image.

In addition, the appearance attributes 305 include one or more characteristics that affect the visual appearance of a vector element at a discrete data point. For example, in one or more embodiments, the appearance attributes 305 include data-point specific color values such as a set of red, green, blue (RGB) color values for each color channel. Additionally, for example, the appearance attributes 305 include data-point specific opacity values that indicate a level of opaqueness (or transparency). Further, in certain implementations, the appearance attributes 305 include gradient values that indicate a directional change in the intensity or color of the vector element at the data point.

At act 306, the vector cluster texturing system 106 uses the sample data points to identify a neighborhood similarity. In general, a neighborhood n(s) of a specific sample data point s comprises a set of sample data points around the spatial vicinity (e.g., radius r) of the sample data point s. In certain implementations, the neighborhood radius r is about ⅙, about ⅛, or about 1/12 of the size of the vector image (e.g., the mean of width and height). As will be described below, neighborhood similarity is composed of three terms: unary sample similarities, induced matching costs for unmatched synthetic data points, and pairwise sample similarities (which is based on cluster identifiers). Acts 308-310 are devoted to describing these terms of neighborhood similarity in turn.

Acts 308-310 describe particular elements of neighborhood similarity under the overarching context that neighborhood similarity is based on the distance $d_n(n(s_o),n(s_i))$ between a sample neighborhood (e.g., an input neighborhood $n(s_i)$ centered at $s_i$) and a synthetic neighborhood (e.g., an output neighborhood $n(s_o)$ centered at $s_o$). The vector cluster texturing system 106 represents this distance according to function (2) as the minimum over all possible matchings between sample data points and synthetic data points:

$$d_n(n(s_o), n(s_i)) = \min_{m_s} \left( \sum_{s'_o \in m_n(n(s_i))} d_s(s'_o, s'_i) + \sum_{s'_o \in n(s_o) \ominus m_n} c + \sum_{s'_o, s''_o \in m_n(n(s_i))} d_s(s'_o, s''_o, s'_i, s''_i) \right) \quad (2)$$

As part of act 308, the vector cluster texturing system 106 determines unary sample similarities. In one or more embodiments, the vector cluster texturing system 106 determines the unary sample similarities by comparing each sample data point in a sample neighborhood ($s'_i \in (n(s_i))$) with each synthetic data point in a synthetic neighborhood ($s'_o \in (n(s_o))$). This point-by-point comparison is represented by the first term in function (2), namely $d_s(s'_o, s'_i)$ for unary sample similarities.

In certain implementations, the vector cluster texturing system 106 determines the unary sample similarities by determining differences in properties ($U(s'_i)$) for sample data points and properties ($U(s'_o)$) for synthetic data points. For example, the vector cluster texturing system 106 determines the unary sample similarities based on differences in spatial parameters (e.g., using the spatial parameters 304). Additionally or alternatively, the vector cluster texturing system 106 determines the unary sample similarities based on differences in appearance attributes (e.g., using the appearance attributes 305). In one or more embodiments, the vector cluster texturing system 106 determines the unary sample similarities using a weighted sum of property differences according to function (3) as follows:

$$d_s(s'_o, s'_i) = d_s^s(s'_o, s'_i) + d_s^A(s'_o, s'_i) \quad (3)$$

In function (3), the first term $d_s^s(s'_o, s'_i)$ represents the unary sample similarities between spatial parameters. In certain implementations, the term $d_s^s(s'_o, s'_i)$ represents the unary sample similarities between spatial parameters $S(s'_o)$ and $S(s'_i)$ according to function (4) as follows:

$$d_s^s(s'_p, s'_o) = \|\hat{p}(s_o, s'_o) - \hat{p}(s_p, s'_i)\|, \quad (4)$$

where $\hat{p}(s, s') = p(s) - p(s')$. Therefore, using function (4), the first term $d_s^s(s'_o, s'_i)$ in function (3) determines a first positional difference between two discrete synthetic data points ($\hat{p}(s_o, s'_o)$), determines a second positional difference between two discrete sample data points $\hat{p}(s_i, s'_i)$, and determines the overall positional difference between the first positional difference and the second positional difference ($\hat{p}(s_o, s'_o) - \hat{p}(s_i, s'_i)$).

For the second term in function (3), $d_s^A(s'_o, s'_i)$ represents unary sample similarities between appearance attributes. Similar to the first term in function (3), $d_s^A(s'_o, s'_i)$ is defined as the weighted sum of differences between the appearance vector $A(s'_o)$ and $A(s'_i)$. In certain implementations, however, the vector cluster texturing system 106 equates the term $d_s^A(s'_o, s'_i)$ to zero because considering the differences between spatial parameters is typically sufficient to evaluate neighborhood similarity. This approach is particularly applicable when different shapes have unique colors (as is often the case).

At act 310, the vector cluster texturing system 106 determines the cost of unmatched synthetic data points. In particular embodiments, the vector cluster texturing system 106 determines the induced matching costs from outliers of synthetic data points that remain unmatched (as represented by c in the second term of function (2) above. In one or more embodiments, the vector cluster texturing system 106 uses a predetermined or constant value for each matching cost of synthetic data points that remain unmatched. Accordingly, in certain implementations, the vector cluster texturing system 106 equates the induced matching costs c in function (2) as equivalent to 2δ, or two times the sampling distance.

At act 312, the vector cluster texturing system 106 determines the pairwise sample similarities. In one or more embodiments, determining the pairwise sample similarities involves comparing pairs of sample data points to pairs of synthetic data points based on cluster identifiers. For example, as represented by the third term in function (2) above, $d_s(s'_i, s''_i, s'_o, s''_o)$ is the pairwise sample similarity between pairs of sample data points $s'_i, s''_i$ and pairs of synthetic data points $s'_o, s''_o$. Given a pair of synthetic data points $s'_o, s''_o$, the matching pair of sample data points is denoted as $s'_i = m_s(s'_o), s''_i = m_s(s''_o)$. In addition, $m_n(n(s_i))$ is the subset of synthetic data points within a synthetic neighborhood $n(s_o)$ matched with sample data points within a sample neighborhood $n(s_i)$.

To determine the pairwise sample similarities based on cluster identifiers, the vector cluster texturing system 106 weights certain pairings of sample data points and synthetic data points as opposed to direct unary comparisons. The purpose of this weighting is because $d_s(s'_o, s'_i)$ in function (3)

does not include differences in cluster identifiers since cluster identifiers are not directly comparable in a unary way as shown in function (5):

$$d_s^i(s'_i, s'_o) = w_i \mathbb{1}\{i(s'_i) \neq i(s'_o)\} \qquad (5)$$

Indeed, cluster identifiers specifically identify groups of data points—not specific vector elements. To illustrate, cluster identifiers for sample data points may include cluster identifiers of "1," "2," and "3" that correspond to cluster identifiers of synthetic data points with cluster identifiers of "a," "b," and "c." As a result, in one or more embodiments, the vector cluster texturing system 106 defines the pairwise sample similarity term in function (2) according to function (6) as follows:

$$d_s(s'_i, s''_i, s'_o, s''_o) = w_i \mathbb{1}\{\mathbb{1}\{i(s'_i) = i(s''_i)\} \neq \mathbb{1}\{i(s'_o) = i(s''_o)\}\} \qquad (6)$$

Using function (6), the vector cluster texturing system 106 encourages specific pairings of sample data points and synthetic data points. In particular embodiments, the vector cluster texturing system 106 determines pairwise sample similarities by matching pairs of sample data points and pairs of synthetic data points that meet certain cluster identifier criteria. For example, the vector cluster texturing system 106 encourages certain pairings by assigning such pairings a corresponding pairwise sample similarity value of zero (i.e., $d_s(s'_i, s''_i, s'_o, s''_o) = 0$). To illustrate, the vector cluster texturing system 106 determines the following pairwise sample similarities go to zero if: (i) cluster identifiers for paired sample data points are identical to each other and cluster identifiers for paired synthetic data points are identical to each other (i.e., $i(s'_i) = i(s''_i)$ and $i(s'_o) = i(s''_o)$) or (ii) cluster identifiers for paired sample data points are different from each other and cluster identifiers for paired synthetic data points are different from each other (i.e., $i(s'_i) = i(s''_i)$ and $i(s'_i)$ and $i(s''_o) \neq i(s''_o)$). Otherwise, the vector cluster texturing system 106 discourages pairings that do not meet the foregoing cluster identifier criteria. For example, the vector cluster texturing system 106 assigns pairings that do not meet the foregoing cluster identifier criteria a corresponding pairwise similarity value of a predetermine constant (i.e., $d_s(s'_i, s''_i, s'_o, s''_o) = w_i$).

Using the neighborhood similarity terms as just described in FIG. 3A, the vector cluster texturing system 106 ultimately approximates function (2) and one or more corresponding terms using the following greedy strategy outlined in FIG. 3B. Specifically, minimizing function (2) is a quadratic assignment problem due to incorporating cluster identifiers in the third term of function (2). Moreover, directly minimizing function (2) lends to outlier sensitivity and potential slow processing speeds. Accordingly, the vector cluster texturing system 106 instead decomposes the quadratic matching process in function (2) into three linear assignment sub-problems reflected in acts 316, 324, and 328 of act 314 to perform neighborhood matching. These three linear assignment sub-problems leverage the common structure of not too many different clusters existing within a neighborhood.

In FIG. 3B, at act 316, the vector cluster texturing system 106 performs a first linear assignment sub-problem by matching sample data points and synthetic data points independent of cluster identifiers. In one or more embodiments, the vector cluster texturing system 106 performs act 316 by minimizing the first two terms in function (2) above. To do so, the vector cluster texturing system 106 uses a cost matrix 318 comprising unary sample similarities 320 (discussed above in relation to act 308) and induced costs 322 from unmatched synthetic data points (discussed above in relation to act 310). In particular embodiments, the vector cluster texturing system 106 generates the cost matrix 318 using the matrix structure by augmenting a cost matrix of the unary sample similarities 320 and a cost matrix of the induced costs 322 from the unmatched synthetic data points.

After generating the cost matrix 318, the vector cluster texturing system 106 uses an optimization model to process the cost matrix 318 (e.g., minimize the cost matrix 318). For example, the vector cluster texturing system 106 utilizes one or more of a combinatorial optimization algorithm, an optimization algorithm for assignment problems, or another optimization algorithm. In certain implementations, the vector cluster texturing system 106 uses the Hungarian algorithm to process the cost matrix 318. Based on processing the cost matrix 318, the vector cluster texturing system 106 determines which sample data points match with which synthetic data points.

At act 324, the vector cluster texturing system 106 performs a second linear assignment sub-problem by matching cluster identifiers between sample neighborhoods and synthetic neighborhoods. In particular embodiments, the vector cluster texturing system 106 matches cluster identifiers for sample data points that correspond to input clusters and cluster identifiers for synthetic data points that correspond to output clusters. In one or more embodiments, the vector cluster texturing system 106 uses an optimization model 326 to match the cluster identifiers. As mentioned previously, vector cluster texturing system 106 optionally utilizes different optimization models (e.g., combinatorial optimization algorithms, optimization algorithms for assignment problems, etc.). In certain implementations, the optimization model 326 comprises the Hungarian algorithm for maximizing the following objective represented by function (7):

$$\underset{m_i}{\operatorname{argMax}} \sum_{\substack{i_o \in I(n_o) \\ i_i = m_i(i_o) \in I(n_i)}} d_i(i_o, i_i), \qquad (7)$$

where $m_i$ is the matching function between input cluster with cluster identifier $i_i$ and output cluster with cluster identifier $i_o$. In addition, $I(n_i)$ is the set of cluster identifiers in a sample neighborhood $(n_i)$, and $I(n_o)$ is the set of cluster identifiers in a synthetic neighborhood $(n_o)$.

Moreover, by maximizing function (7) as part of the optimization model 326, the vector cluster texturing system 106 matches input clusters and output clusters that have a large number of matching cluster identifiers $d_i(i_o, i_i)$. In certain implementations, the number of matching cluster identifiers corresponds to the number of matched sample pairs $\{(s'_o, s'_i)\}$ determined from the first linear assignment sub-problem described above in relation to act 316 (where $i(s'_o) = i_o$ and $i(s'_i) = i_i$). Accordingly, in one or more embodiments, the vector cluster texturing system 106 represents $d_i(i_o, i_i)$ in function (7) according to function (8) as follows:

$$d_i(i_o, i_i) = \sum_{\substack{s'_o \in n(s_o) \\ s'_i = m_s(s'_o) \in n(i)}} \mathbb{1}\left[(i(s'_o) = i_o \wedge i(s'_i) = i_i)\right] \qquad (8)$$

At act 328, the vector cluster texturing system 106 performs a third linear assignment sub-problem by approximating function (2) to efficiently determine the sample matching $m_s$ in a sample neighborhood and synthetic neighborhood pairing. In particular embodiments, act 328 comprises the vector cluster texturing system 106 matching the sample data points to the synthetic data points utilizing matched cluster identifiers from the second linear assignment sub-problem described above in act 324. To do so, the vector cluster texturing system 106 utilizes an optimization model 330 based on function (9) as follows:

$$d_n(n(s_o), n(s_i)) = \min_{m_s} \Big( \sum_{k'_o \in m_n(n(s_i))} d_s(s'_o, s'_i) + \sum_{k'_o \in n(s_o) \ominus m_n} c + \sum_{k'_0 \in m_n(n(s_i))} w'_i \Big[ (i(s_i) \neq m_i(i(s'_o))) \Big] \quad (9)$$

The optimization model 330 utilizes an optimization algorithms (similar to the optimization model 326). In one or more embodiments, however, the vector cluster texturing system 106 uses the Hungarian algorithm to minimize function (9). In particular, the first two terms in function (9) are the same first two terms in function (2) defined above. Different from function (2) though, the third term in function (9) is the unary term that approximates the quadratic third term in function (2).

In the third term of function (9), the vector cluster texturing system 106 encourages matching pairs of sample data points and synthetic data points if their cluster identifiers are matched ($i(s'_i)=m_i(i(s'_o))$ according to function (7) above for the second linear assignment sub-problem. In other words, if two synthetic data points $s_o, s'_o$, have a same cluster identifier ($i(s_o)=i(s'_o)$), the vector cluster texturing system 106 favors matching these synthetic data points $s_o, s'_o$, with sample data points that share a same cluster identifier ($i(s_i)=i(s'_i)$). Thus, similar to function (6) representing the third term in function (2), the vector cluster texturing system 106 in function (9) favors matching a pair of sample data points and a pair of synthetic data points if cluster identifiers for paired sample data points are identical to each other and cluster identifiers for paired synthetic data points are identical to each other.

For example, in certain implementations, the vector cluster texturing system 106 assigns such favored pairings a corresponding pairwise similarity value approaching zero. Otherwise, without meeting this cluster identifier criteria, the vector cluster texturing system 106 uses function (9) to weight (or disfavor) matching a pair of sample data points and a pair of synthetic data points. Specifically, the vector cluster texturing system 106 assigns these disfavored pairings with a weighted pairwise similarity value of $w'_i=\delta/2$.

Figure 4:
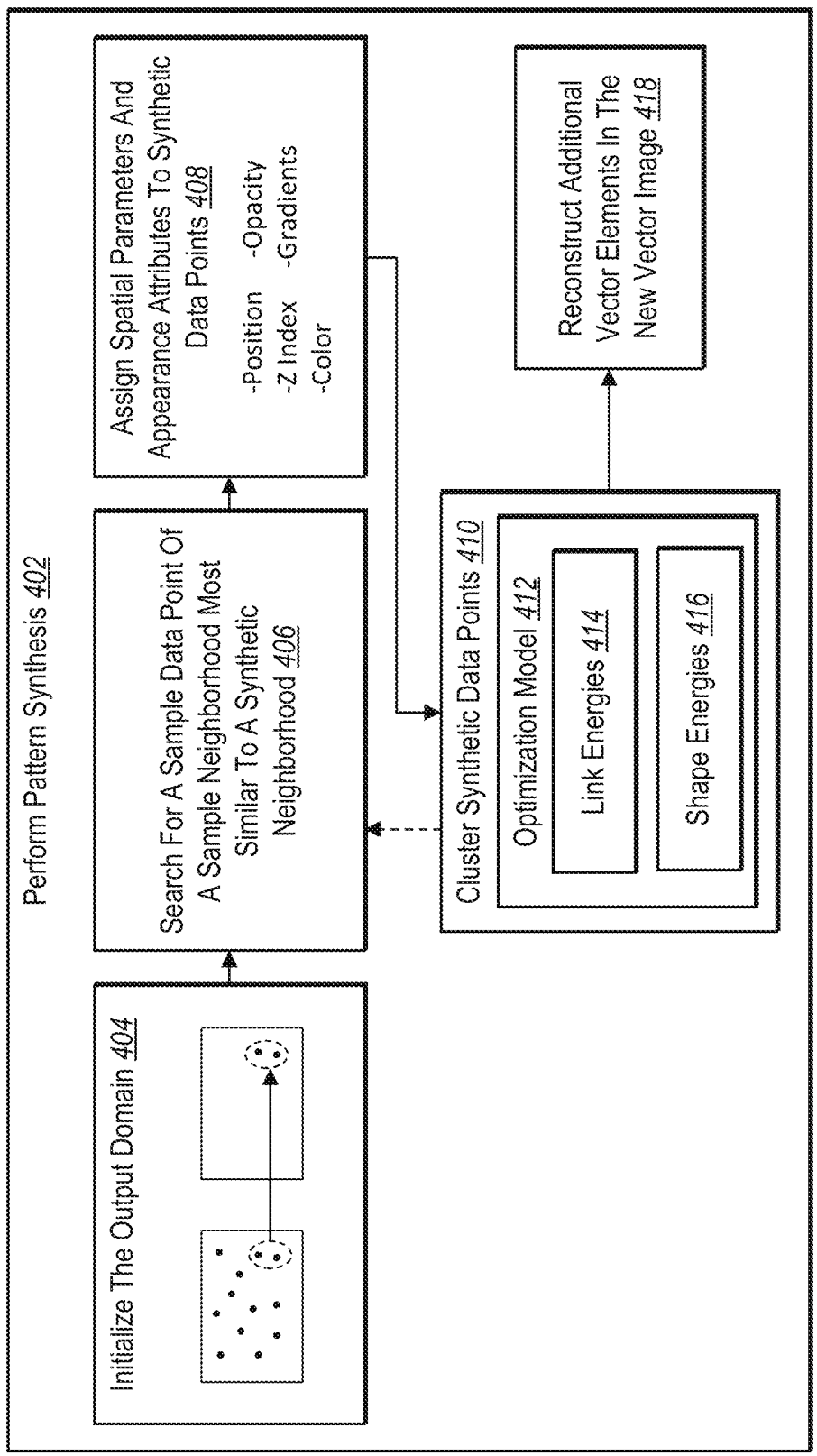
FIG. 4 illustrates a vector cluster texturing system using a search-assign-clustering approach for pattern synthesis to generate a new vector image in accordance with one or more embodiments.

As mentioned above, the vector cluster texturing system 106 is able to synthesize a wide variety of different vector patterns—including vector patterns with complex vector structures. To flexibly and efficiently generate such vector patterns, the vector cluster texturing system 106 uses a search-assign-clustering approach. FIG. 4 illustrates the vector cluster texturing system 106 using a search-assign-clustering approach for pattern synthesis to generate a new vector image in accordance with one or more embodiments.

In particular, FIG. 4 depicts the vector cluster texturing system 106 implementing act 402 to perform pattern synthesis. In one or more embodiments, the vector cluster texturing system 106 bases one or more portions of act 402 on an optimization problem between input I and output O. Function (10) captures this input-output optimization problem:

$$O^* = \underset{O}{\operatorname{argmin}} \sum_{\substack{s_0 \in O \\ s_i=\mu_s(s_o)}} d_n(n(s_o), n(s_i)), \quad (10)$$

where the summation loops over all the local synthetic neighborhoods over output O. The term $n(s_i)$ is the most similar sample neighborhood to synthetic neighborhood $n(s_o)$. In addition, $s_i=\mu_s(s_o)$ indicates that a synthetic data point $s_o$ is matched with a sample data point $s_i$, in the nearest-neighbor field. Additionally, $\mu_s$ represents the matching function equivalent to the nearest-neighbor field between the input I and the output O. Therefore, $\mu_s$ differs from the sample matching function $m_s$ between two matched neighborhoods in function (2).

To minimize function (10), the vector cluster texturing system 106 performs a series of sub-acts for act 402 (namely acts 404, 406, 408, 410, and 418) for synthesizing a vector pattern for a new vector image. Moreover, in one or more embodiments, one or more of these sub-acts are iterative. For example, in one or more embodiments, the vector cluster texturing system 106 iteratively performs the search-assign-clustering steps to minimize function (10) (e.g., as depicted by the return arrow between act 410 and act 406). In certain implementations, the vector cluster texturing system 106 performs between two and ten iterations of search-assign clustering within each hierarchy sampling level. In particular embodiments, the vector cluster texturing system 106 performs seven iterations of search-assign clustering within each hierarchy sampling level.

At act 404, the vector cluster texturing system 106 initializes an output domain for generating a new vector image. To do so, the vector cluster texturing system populates an initial portion of the output domain using portions of the vector image or input exemplar. In particular embodiments, the vector cluster texturing system 106 randomly copies input patches from the vector image into the output domain. Additionally, or alternatively, the vector cluster texturing system 106 performs act 404 by using random sample initialization. In certain implementations, however, the vector cluster texturing system 106 uses patch-based initialization to converge faster and/or improve processing performance of subsequent acts.

At act 406, the vector cluster texturing system 106 searches for a sample data point of a sample neighborhood that is most similar to a synthetic neighborhood. In other terms, the vector cluster texturing system 106 determines sample data points that match to synthetic data points. In one or more embodiments, the vector cluster texturing system 106 performs act 406 as described above in relation to FIGS. 3A-3B. In particular embodiments, the vector cluster texturing system 106 determines sample matchings by using the optimization model 330 based on function (9) to process unary sample similarities, induced matching costs, and a unary approximation of pairwise-sample similarities (e.g., as an approximation of function (2)).

At act 408, the vector cluster texturing system 106 assigns spatial parameters and appearance attributes for synthetic data points. In one or more embodiments, the vector cluster texturing system 106 uses various approaches depending on the type of parameter or attribute to assign. Regardless of the approach, in particular embodiments, the vector cluster texturing system 106 assigns spatial parameters and appearance attributes by leveraging the sample matchings between sample data points and synthetic data points determined at the previous search step of act 406. Additionally, or alternatively, the vector cluster texturing system assigns spatial parameters and appearance attributes by leveraging corresponding parameters and attributes of sample data points that belong to overlapping sample neighborhoods.

To illustrate, the vector cluster texturing system 106 determines position parameters for synthetic data points by using least squares to minimize the sum of differences between actual distances and expected distances between pairs of synthetic data points. For appearance attributes, the vector cluster texturing system 106 uses a voting scheme to determine most probable appearance attributes for the synthetic data points. For example, the vector cluster texturing system 106 determines the most probable appearance attributes by using overlapping sample neighborhoods of the matched sample data points to vote for each synthetic data point. In turn, the vector cluster texturing system 106 assigns appearance attributes to synthetic data points based on the most votes (each vote being a value ranging [0,1]) from matched sample data points. As part of the assignment process, in one or more embodiments, the vector cluster texturing system 106 adaptively adds or removes synthetic data points.

In addition to position and appearance parameters, the vector cluster texturing system 106 also assigns z-index values to synthetic data points. Vector patterns may include overlapping vector elements where one vector element with a larger z-index value covers, at least partially, another vector element with a smaller z-index value. Thus, to preserve layer relationships between vector elements, the vector cluster texturing system 106 optimizes assignment of z-index values as follows.

In one or more embodiments, the vector cluster texturing system 106 leverages z-index order because exact z-index values are often relative in nature, and therefore, less significant. To determine z-index order, the vector cluster texturing system 106 uses one or more ordering functions. In certain implementations, the vector cluster texturing system 106 uses a probabilistic pairwise ordering function $f_s(s_o, s'_o) \in [0,1]$. The value of $f_s(s_o, s'_o)$ indicates the probability of a synthetic sample data point $s_o$ being below another synthetic sample data point $s'_o$.

To determine the value of $f_s(s_o, s'_o)$, the vector cluster texturing system 106 uses matched sample neighborhoods and synthetic neighborhoods. Specifically, in a pair of matched neighborhoods comprising a sample neighborhood $n_i$ and a synthetic neighborhood $n_o$, the vector cluster texturing system 106 leverages the following characteristic or relationship of z-index values: if $z(m_s(s_o)) < z(m_s(s'_o))$, then $z(s_o) < z(s'_o)$, where $m_s(s_o) = s_i$ and $m_s(s'_o) = s'_i$. In other terms, if a z-index value of a first matched sample data point is less than the z-index value of a second matched sample data point, then the z-index value of a first synthetic data point corresponding to the first matched sample data point is less than the z-index value of a second synthetic data point corresponding to the second matched sample data point.

In one or more embodiments, the vector cluster texturing system 106 extends the foregoing relationship in z-index values between matched sample data points and synthetic data points to represent the probabilistic pairwise ordering function $f_s(s_o, s'_o)$ according to functions (11), (12), and (13) as follows:

$$f_s(s_o, s'_o) = \frac{|N_z^\delta(s_o, s'_o)|}{|N_n^\delta(s_o, s'_o)|} \quad (11)$$

$$N_n^\delta(s_o, s'_o) = \{n_o \mid s_o, s'_o \in n_o, n_o \in \{(n_i, n_o)\}, \quad (12)$$

$$\|p(s_o) - p(s'_o)\| < 2\delta\}$$

$$N_z^\delta(s_o, s'_o) = n_o \mid z(m_s(s_o)) < z(m_s(s'_o)), n_o \in N_n^\delta(s_o, s'_o)\}, \quad (13)$$

where $\{(n_i, n_o)\}$ is the set of matched sample neighborhoods and synthetic neighborhoods determined in the search step described above for act 406. The term $N_n^\delta(s_o, s'_o)$ represents the set of overlapping synthetic neighborhoods over synthetic data points $s_o, s'_o$, such that the distance $\|p(s_o) - p(s'_o)\|$ between synthetic data points $s_o, s'_o$ is less than twice the sampling distance (or $2\delta$). The purpose for limiting the distance between the synthetic data points $s_o, s'_o$ is to consider only pairs of synthetic data points that are sufficiently close for potential overlap. In addition, the term $N_z^\delta(s_o, s'_o)$ represents the subset of $N_n^\delta(s_o, s'_o)$ where the matched sample data point $m_s(s_o)$ is below $m_s(s'_o)$ (e.g., as denoted by $z(m_s(s_o)) < z(m_s(s'_o))$). Further, "|•|" represents the size of a set "•".

In certain embodiments, the vector cluster texturing system 106 focuses on depth order of specific clusters (or reconstructed vector elements) as opposed to isolated synthetic data points. Accordingly, in one or more embodiments, the vector cluster texturing system 106 uses a pairwise ordering function based on output clusters. For example, the vector cluster texturing system 106 determines a pairwise ordering function according to function (14) as follows:

$$f_C(C_i, C_j) = \frac{1}{Z} \sum_{s_o \in C_i} \sum_{s'_o \in C_j} f_s(s_o, s'_o), \quad (14)$$

where Z represents the normalization factor that counts the number of entries within the double summation. To solve function (14), the vector cluster texturing system 106 utilizes one or more solvers or algorithms. In particular embodiments, the vector cluster texturing system 106 solves function (14) to determine the z-index values for clusters of synthetic data points by using the "Order-By-Preferences" algorithm as described in WWCRE Schapire and Yoram Singer, *Learning To Order Things*, In Advances in Neural Information Processing Systems 10 (1998), 451, the contents of which are expressly incorporated herein by reference.

At act 410, the vector cluster texturing system 106 clusters synthetic data points by updating corresponding cluster identifiers. In one or more embodiments, the clustering at act 410 is based on two principles: (i) in a pair of matched sample neighborhoods and synthetic neighborhoods $(n_i, n_o)$, if the sample data points are within the same cluster, the corresponding matched synthetic data points tend to be within the same cluster; and (ii) the shape of the output cluster shape should be close to a shape of an input cluster. In particular embodiments, the vector cluster texturing system 106 incorporates these two principles into an optimization model 412.

In certain implementations, the optimization model 412 provides an alternative to minimizing function (10) above with respect to cluster identifier. Under the approach of minimizing function (10), the vector cluster texturing system 106 would brute-force search over all possible cluster configurations. Instead, the optimization model 412 provides a more efficient approach defined over output clusters $\{C_o^k\}$ (where k is the index of clusters). Specifically, the optimization model 412 implements an efficient, greedy optimization algorithm to optimize function (15) based on link energies 414 and shape energies 416 as follows:

$$E(\{C_o^k\}) = \sum_i \sum_{C_o^j \in \mathcal{A}(C_o^i)} E_e(C_o^i, C_o^j) + w_s \sum_i E_s(C_o^i) \quad (15)$$

The link energies 414 and the shape energies 416 of function (15) are now each described in turn. However, the particular details of the optimization model 412 implementing the greedy algorithm for minimizing function (15) is described below in relation to FIG. 5.

In one or more embodiments, $E_e$ represents the link energies 414 defined between two adjacent output clusters $C_o^j \in \mathcal{A}(C_o^i)$. To build the adjacency relationship $\mathcal{A}$ of clusters, the vector cluster texturing system 106 constructs a fixed-radius nearest neighbor graph (FR-NNG) for synthetic data points. The fixed radius can be a variety of different radii. In certain implementations, however, the fixed radius is $2\delta$ (or twice the sampling distance). In turn, the vector cluster texturing system 106 identifies, for a pair of clusters $C_o^i, C_o^j$, one or more pairs of synthetic data points adjacent to each other on the FR-NNG. The one or more pairs of synthetic data points adjacent to each other on the FR-NNG are denoted as $C_o^j \in \mathcal{A}(C_o^i)$ and $C_o^i \in \mathcal{A}(C_o^j)$.

In one or more embodiments, the vector cluster texturing system 106 uses the term $E_e(C_o^i, C_o^j)$ to represent the measured link energy (or level of affinity) between two output clusters $C_o^i, C_o^j$. If the vector cluster texturing system 106 determines that the link energy is high (e.g., above a threshold link energy) between two output clusters $C_o^i, C_o^j$, this suggests some synthetic data points from one output cluster might belong to the other output cluster, the two output clusters $C_o^i, C_o^j$ could be merged together, or at least one of the output clusters should not be split into separate clusters. Therefore, the objective of function (15) is to minimize the link energies 414 between separate output clusters (e.g., to obtain more accurate cluster representations to reconstruct for a new vector image).

To determine the link energies 414, the vector cluster texturing system 106 determines a link confidence $l \in [0,1]$ of two synthetic data points $s_o, s'_o$, belonging to a same output cluster from the matched sample neighborhoods and synthetic neighborhoods $\{(n_i, n_o)\}$ according to functions (16), (17), and (18) as follows:

$$l(s_o, s'_o) = \frac{|N_l(s_o, s'_o)|}{|N_n(s_o, s'_o)|} \quad (16)$$

$$N_n(s_o, s'_o) = \{n_o \mid s_o, s'_o \in n_o, n_o \in \{(n_i, n_o)\}\} \quad (17)$$

$$N_l(s_o, s'_o) = \{n_o \mid i(m_s(s_o)) = i(m_s(s'_o)), n_o \in N_n(s_o, s'_o)\} \quad (18)$$

The term $N_n(s_0, s'_0)$ represents the set of matched synthetic neighborhoods overlapping both sample data points $s_0, s'_0$. In addition, the term $N_l(s_o, s'_o)$ represents the subset of $N_n(s_o, s'_o)$ where the matched sample data points $m_s(s_o)$ and $m_s(s'_o)$ have a same cluster identifier (denoted as $i(m_s(s_o))=i(m_s(s'_o))$).

To determine the link confidence l of two synthetic data points $s_0, s'_0$) belonging to a same output cluster, the vector cluster texturing system 106 utilizes one or more approaches. In certain implementations, the vector cluster texturing system 106 utilizes a voting scheme. Specifically, all synthetic neighborhoods overlapping both synthetic data points $s_o, s'_o$, vote to determine the link confidence l. The larger $l(s_o, s'_o)$ is, the more likely the synthetic data points $s_0, s'_0$ belong to the same cluster. Additionally, it will be appreciated that $l(s_o, s'_o)$ is undefined when $N_n(s_o, s'_o)=0$.

After determining the link confidence, in one or more embodiments, the vector cluster texturing system 106 determines the link energies 414 according to functions (19) and (20) as follows:

$$E_e(C_o^i, C_o^j) = \frac{2}{|N_e|} \cdot \sum_{\substack{s_o \in C_o^i \\ |N_n(s_o,s'_o)| \neq 0}} \sum_{s'_o \in C_o^j} l(s_o, s'_o) - 1 \quad (19)$$

$$N_e(C_o^i, C_o^j) = \{\{s_o, s'_o\} \mid s_o \in C_o^i, s'_o \in C_o^j, N_n(s_o, s'_o) \neq 0\} \quad (20)$$

where link energy $E_e$ is defined for all values in the range $[-1,1]$. In function (19), the vector cluster texturing system 106 determines the double of average link confidence l between two output clusters $C_o^i, C_o^j$ for the set of entries $N_e$ within the double summation. Based on function (19), the link energy $E_e=0$ between two output clusters $C_o^i, C_o^j$ when the average corresponding link confidence $l(s_o, s'_o)=0.5$. Moreover, if the vector cluster texturing system 106 determines that the link energy $E_e$ is low (or negative), then the average corresponding link confidence $l(s_o, s'_o)<0.5$. In one or more embodiments, a negative link energy $E_e$ indicates that the two output clusters $C_o^i, C_o^j$ should likely be two separate output clusters. In contrast, if the vector cluster texturing system 106 determines that the link energy $E_e$ is large (or positive), then the average corresponding link confidence $l(s_0, s'_0)>0.5$. In certain implementations, a large or positive link energy indicates the two output clusters $C_o^i, C_o^j$ should likely be merged together (e.g., to reduce the link energies 414 in function (15) as will be described more below in relation to FIG. 5).

With respect to the shape energies 416, the term shape energy $E_s(C_o)$ in function (15) measures the differences between shapes of output clusters and shapes of corresponding input clusters $\{C_i\}$. A large shape energy $E_s(C_o)$ indicates that a shape of the output cluster $C_o$ is dissimilar to a shape of the input cluster $C_i$. Therefore, as described more below in relation to FIG. 5, the objective of function (15) is to also minimize the shape energies 416 between shapes of input and output clusters for a more accurate cluster representation.

In addition, the weight $w_s$ in function (15) comprises a balancing or emphasis factor (e.g., to tune the optimization balance between the link energies 414 and the shape energies 416). In certain implementations, $w_s=2$ such that the vector cluster texturing system 106 weights minimizing the shape energies 416 twice as much as the link energies 414.

To determine the shape energies 416, the vector cluster texturing system 106 determines shape distances between input clusters and output clusters. For example, the vector cluster texturing system 106 uses an objective function (e.g., as part of the optimization model 412) based on shaped distances. In particular embodiments, the objective function is defined by function (21) as follows:

$$E_s(C_o) = \min_{C_i \in \{C_i\}} d_C(C_i, C_o), \quad (21)$$

where $d_C(C_i,C_o)$ is the shape distance between an input cluster $C_i$ and an output cluster $C_o$. In addition, $\{C_i\}=\{C_i|s_i\in C_i, s_o\in C_o, s_i=\mu_s(s_o)\}$, which is the set of candidate input clusters that have their sample data points $s_i$ matched with the synthetic data points $s_o$ of the output cluster $C_o$ in the search step described above in relation to act 406.

In one or more embodiments, the vector cluster texturing system 106 specifically defines the shape distance $d_C(C_i,C_o)$ according to function (22) as follows:

$$\min_{s_o=m(s_i)} \left( \sum_{\substack{s_o\in C_o \\ s_i\in C_i}} \|p(s_o) - \mathcal{T}_r(p(s_i), C_i, C_o)\| + c\cdot\text{abs}(|C_o| - |C_i|) \right) \quad (22)$$

In the first term of function (22), the vector cluster texturing system 106 determines the sum of distances between the translated sample data points $s_i \in C_i$ by $\mathcal{T}_r$ and synthetic data points $s_o \in C_o$. In the second term of function (22), the vector cluster texturing system 106 multiplies the constant c by the absolute value of the difference between the number of synthetic data points for output cluster $|C_o|$ and the number of sample data points for input cluster $|C_i|$. In addition, c (e.g., $2\delta$) represents the extra matching costs induced by the difference between numbers of sample data points for input cluster $|C_i|$ and synthetic data points for output cluster $|C_o|$.

Further, the term $\mathcal{T}_r$ in function (22) represents the translation distance function for translating sample data points $s_i \in C_i$ of input clusters to the position of synthetic data points $s_o \in C_o$ of output clusters. Accordingly, in one or more embodiments, the vector cluster texturing system 106 determines shape distances based on translation distances between data points and synthetic data points matched together in corresponding input clusters and output clusters. In specific embodiments, the vector cluster texturing system 106 defines the translation distance function $\mathcal{T}_r$ according to function (23) as follows:

$$\mathcal{T}_r(p(s_i), C_i, C_o) = p(s_i) + \frac{1}{|\mathcal{S}(C_i, C_o)|} \sum_{(s_i', s_o') \in \mathcal{S}(C_i, C_o)} (p(s_o') - p(s_i')), \quad (23)$$

where $\mathcal{S}(C_i,C_o)=\{(s_i,s_o)|s_i\in C_i, s_o=\mu_s s_i)\in C_o\}$ is a set of matched data point pairs comprising sample data points associated with the input cluster $C_i$ and synthetic data points associated with the output cluster $C_o$. Based on function (23), the vector cluster texturing system 106 determines that the translation is the average of all translation distances between data pairs within $\mathcal{S}(C_i,C_o)$.

Using the link energies 414 and the shape energies 416 just described, the vector cluster texturing system 106 uses the optimization model 412 to optimize function (15). Indeed, as will be described below in relation to FIG. 5, the vector cluster texturing system 106 performs an iterative optimization based on local operators that include sample switching between output clusters, merging output clusters, and splitting output clusters.

Upon achieving an optimized cluster configuration of output clusters, the vector cluster texturing system 106 performs act 418 to reconstruct additional vector elements in a new vector image. In one or more embodiments, the vector cluster texturing system 106 reconstructs the additional vector elements by translating vector elements from the vector image to populate the additional vector elements of the new vector image. In certain implementations, the translated vector elements are a subset of vector elements corresponding to one or more input clusters that have a minimized shape energy (per function (21)) with one or more output clusters corresponding to the additional vector elements.

Additionally or alternatively, the vector cluster texturing system 106 filters out certain vector elements for use in reconstructing the additional vector elements. For example, in certain embodiments, the vector cluster texturing system 106 filters out vector elements corresponding to additional vector elements (e.g., based on matched input clusters and output clusters). To illustrate, the vector cluster texturing system 106 filters out one or more vector elements corresponding to an additional vector element based on at least one output cluster having a shape energy that satisfies a threshold shape energy (e.g., $E_s(C_o)>2\delta|C_o|$).

Figure 5:
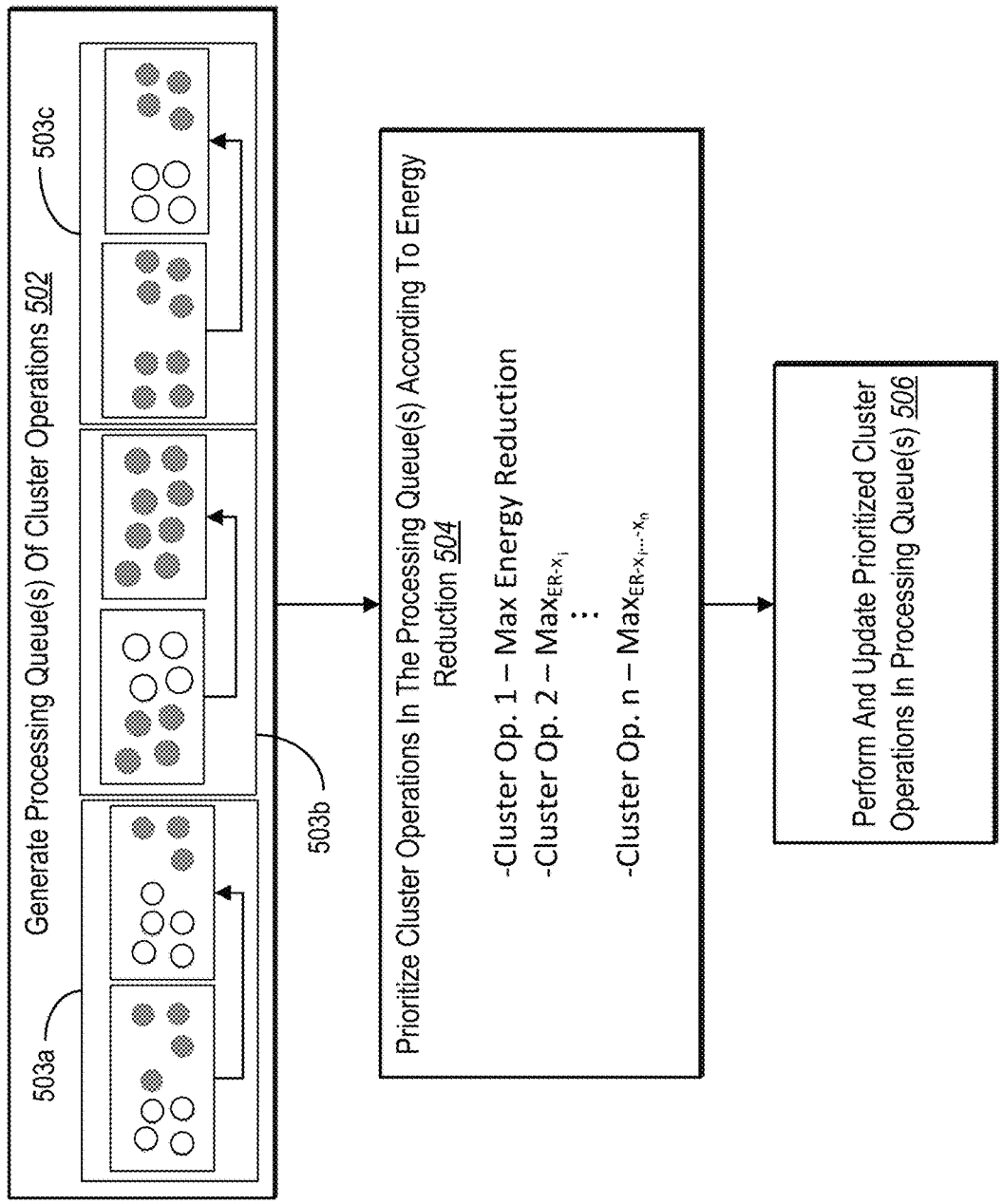
FIG. 5 illustrates a vector cluster texturing system using one or more processing queues to perform and update prioritized cluster operations in accordance with one or more embodiments.

As discussed above, the vector cluster texturing system 106 uses an optimization model to optimize cluster configurations of output clusters. In so doing, the vector cluster texturing system 106 more accurately and more efficiently generate a synthetic pattern for a new vector image. FIG. 5 illustrates the vector cluster texturing system 106 using one or more processing queues to perform and update prioritized cluster operations in accordance with one or more embodiments.

Moreover, FIG. 5 depicts acts and algorithms of the optimization model 412 for optimizing function (15) with respect to $\{C_o^k\}$ based on link energies and shape energies described above. As will be discussed below, the vector cluster texturing system 106 implements a greedy algorithm that leverages the energy variations (i.e., shape energy variations and link energy variations) induced by performing certain cluster operations according to a prioritized processing queue.

At act 502, the vector cluster texturing system 106 generates one or more processing queues of cluster operations. The cluster operations include one or more of cluster operations 503a-503c. The cluster operation 503a corresponds to sample switching by switching a synthetic data point from a first output cluster to a second output cluster (where the first and second output clusters are adjacent to each other or within a threshold distance according to the adjacency relationship $\mathcal{A}$ of output clusters). The cluster operation 503b corresponds to cluster merging by merging two or more separate output clusters together. The cluster operation 503c corresponds to cluster splitting by splitting an output cluster into two or more output clusters.

In one or more embodiments, the vector cluster texturing system 106 generates two processing queues, $P_s$ and $P_C$. The processing queue $P_s$ is for all sample switching operations (like cluster operation 503a). In addition, the processing queue $P_C$ is for all cluster merging and cluster splitting operations (like cluster operations 503b-503c).

To generate the processing queue $P_s$, the vector cluster texturing system 106 focuses on boundary portions of clusters because only synthetic data points on or near boundaries of clusters are switchable to adjacent clusters. Specifically, the vector cluster texturing system 106 extracts the boundary synthetic data points of a cluster using concave hull. In turn, the vector cluster texturing system 106 collects and adds each of the possible sample switching operations to the processing queue $P_s$.

To generate the processing queue $P_C$, the vector cluster texturing system 106 merges pairs of adjacent output clusters together. The vector cluster texturing system 106 then collects and adds each of the possible cluster merging operations to the processing queue $P_C$. Similarly, for each output cluster, the vector cluster texturing system 106 splits the output cluster into at least two clusters using normalized cuts. For the normalized cuts, the graph weights are the link confidence 1 described above. The vector cluster texturing system 106 then collects and adds each of the possible cluster splitting operations to the processing queue $P_C$.

At act 504, the vector cluster texturing system 106 prioritizes cluster operations in the processing queue(s) according to energy reduction. For example, given a set of output clusters, the vector cluster texturing system 106 determines which cluster operations to perform and in relation to which clusters based on the reduction amount of link energies, shape energies, or both. Based on the amount of energy reduction, the vector cluster texturing system 106 arranges the processing queues by ordering the cluster operations in sequential order from max energy reduction to least energy reduction.

At act 506, the vector cluster texturing system 106 performs and updates prioritized cluster operations according to the processing queue(s). For example, the vector cluster texturing system 106 performs the front operator (e.g., the first cluster operation for max energy reduction) provided in the processing queue(s) by updating the output cluster configurations $\{C_o^k\}$ to incorporate the first cluster operation. In turn, the vector cluster texturing system 106 vector cluster texturing system 106 updates the processing queue(s) by removing the performed cluster operation. In certain implementations, the vector cluster texturing system 106 also updates the processing queue(s) following performance of the first cluster operation by removing affected cluster operations (e.g., cluster operations that cannot be performed due to performance of the first cluster operation). In addition, the vector cluster texturing system 106 updates the processing queue(s) to include additional or alternative cluster operations (e.g., cluster operations now available based on performance of the first cluster operation). The vector cluster texturing system 106 is now ready to perform a second front operator (e.g., the second cluster operation for next most energy reduction). It will be appreciated that the update of the processing queue(s) are efficient because cluster operations are local.

In this manner, the vector cluster texturing system 106 iteratively (and efficiently) performs cluster operations to minimize function (15). In particular embodiments, the vector cluster texturing system 106 iterates the foregoing performance-update process until a stopping criterion is met. For example, once the front operator (e.g., the next cluster operation) fails to reduce the energy per function (15), the vector cluster texturing system 106 stops iterating and determines the output cluster configuration is final. That is, the vector cluster texturing system 106 iterates performing cluster operations according to the processing queue(s) until at least one of the shape energies or the link energies is not reduced. In more particular embodiments, the vector cluster texturing system 106 iterates performing cluster operations according to the processing queue(s) until a sum of the shape energies and the link energies is no longer reduced.

Additionally or alternatively, after the vector cluster texturing system 106 performs a threshold number of iterations, the vector cluster texturing system 106 stops iterating and determines the output cluster configuration is final. In certain implementations, the threshold number of iterations depends on the processing queue. For instance, a max iteration threshold for the processing queue $P_s$ is equivalent to the number of synthetic data points. Additionally, for instance, a max iteration threshold for the processing queue $P_C$ is equivalent to the number of initial output clusters.

Algorithm (1) provided below summarizes the foregoing performance-update process of act 506 according to one or more embodiments:

Algorithm (1):
1: function QueueProcessing(P,$\{C_0^k\}$,$i_{max}$){P is a priority queue,
    $\{C_0^k\}$ is the output clusters, $i_{max}$ is the threshold of number of iterations}
2: i=0{counter}
3: while front(P)decreasesE($\{C_0^k\}$) and i<$i_{max}$do
    {front(P) returns the front operators in P}
4: Update $\{C_0^k\}$
5: Update P
6: i←i+1
    end
7: return $\{C_0^k\}$ In particular embodiments, the vector cluster texturing system 106 performs the processing queue(s) in a particular order. For example, the vector cluster texturing system 106 first performs the cluster operations within the processing queue $P_s$ for all sample switching operations. Afterwards, the vector cluster texturing system 106 then performs the cluster operations within the processing queue $P_C$ for all cluster merging and cluster splitting operations. In certain embodiments, the vector cluster texturing system 106 uses this processing order because the vector cluster texturing system 106 implements different weights $w_s$ in function (15) for prioritizing and determining the cluster operations. To illustrate, when prioritizing and determining sample switching operations, the vector cluster texturing system 106 sets the weight $w_s$=0 to avoid the computational cost from the shape energy $E_s$ term.

In addition, Algorithm (2) provided below summarizes acts 502-506 according to one or more embodiments:

Algorithm (2):
1: function ClusteringStep($\{C_0^k\}$)
2: Initialize $P_s$ by collecting all possible sample switching operations using $\{C_o^k\}$
3: $\{C_0^k\}$=QueueProcessing($P_s$,$\{C_0^k\}$, |$\{s_0\}$|) {|$\{s_0\}$| is the number of output samples}
4: Initialize $P_c$ by collecting all possible cluster > splitting
> merging operators using $\{C_0^k\}$
5: $\{C_0^k\}$=QueueProcessing($P_C$,$\{C_0^k\}$,|$\{C_0^k\}$|){|$\{C_0^k\}$| is the number of initial clusters}
6: return $\{C_0^k\}$ As discussed above, the vector cluster texturing system 106 the vector cluster texturing system 106 auto-generates synthetic vector patterns with efficiency and accuracy. In addition, the new vector images are in vector format (e.g., to facilitate user editing of a synthetic vector pattern in a vector graphics editor). FIGS. 6A-6D illustrate a computing device 600 presenting user interfaces 602*a*-602*d* for generating and interacting with a synthetic vector pattern in accordance with one or more embodiments.

Figure 6A:
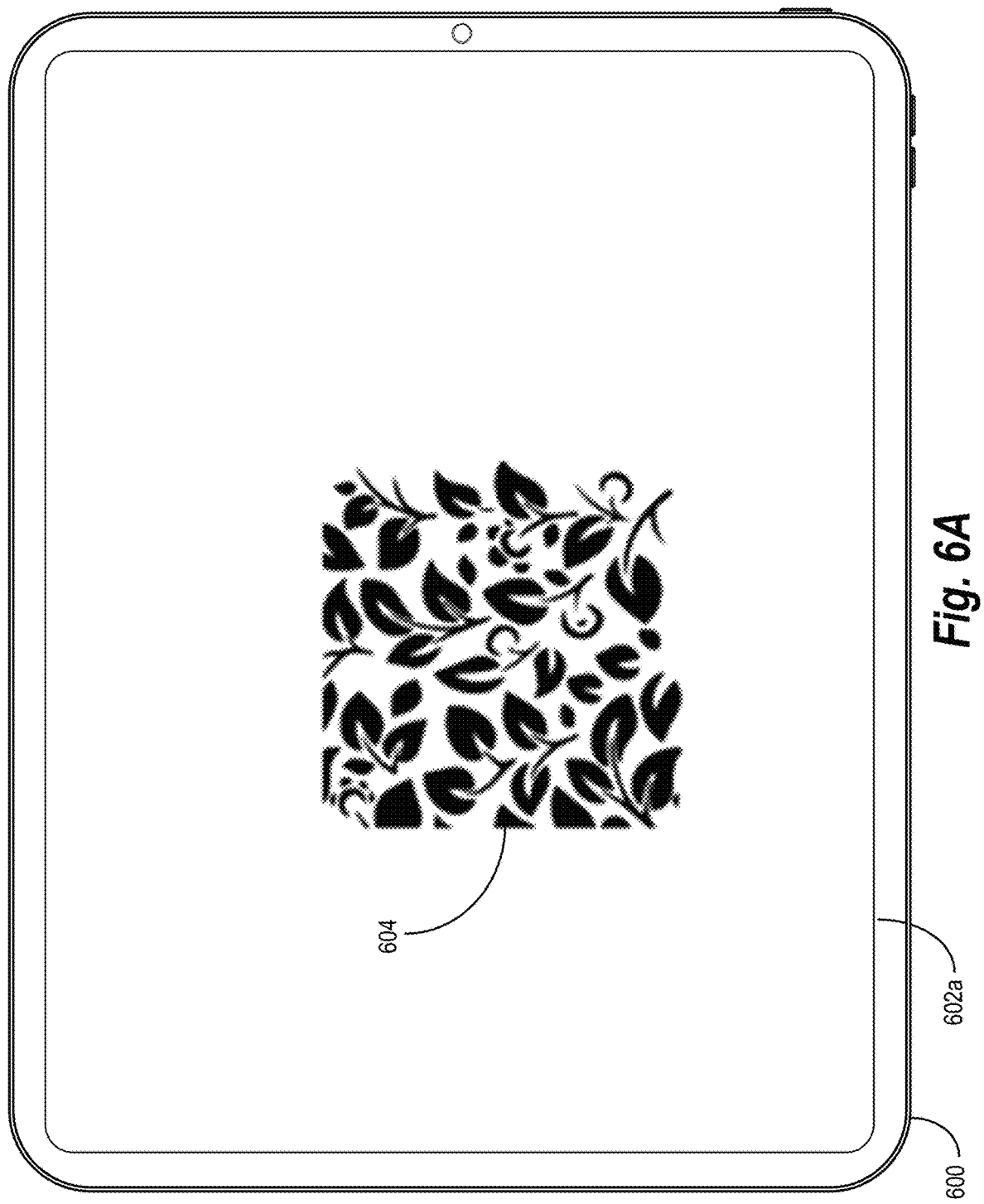
FIGS. 6A-6D illustrate a computing device presenting user interfaces for generating and interacting with a synthetic vector pattern in accordance with one or more embodiments.

As shown in FIG. 6A, the computing device 600 presents the user interface 602*a* comprising a vector image 604. As described above, the vector image 604 comprises an exemplar image. For instance, the vector image 604 comprises an SVG file downloaded from a data store, uploaded from the computing device 600, selected for implementation via a software application, etc.

Figure 6B:
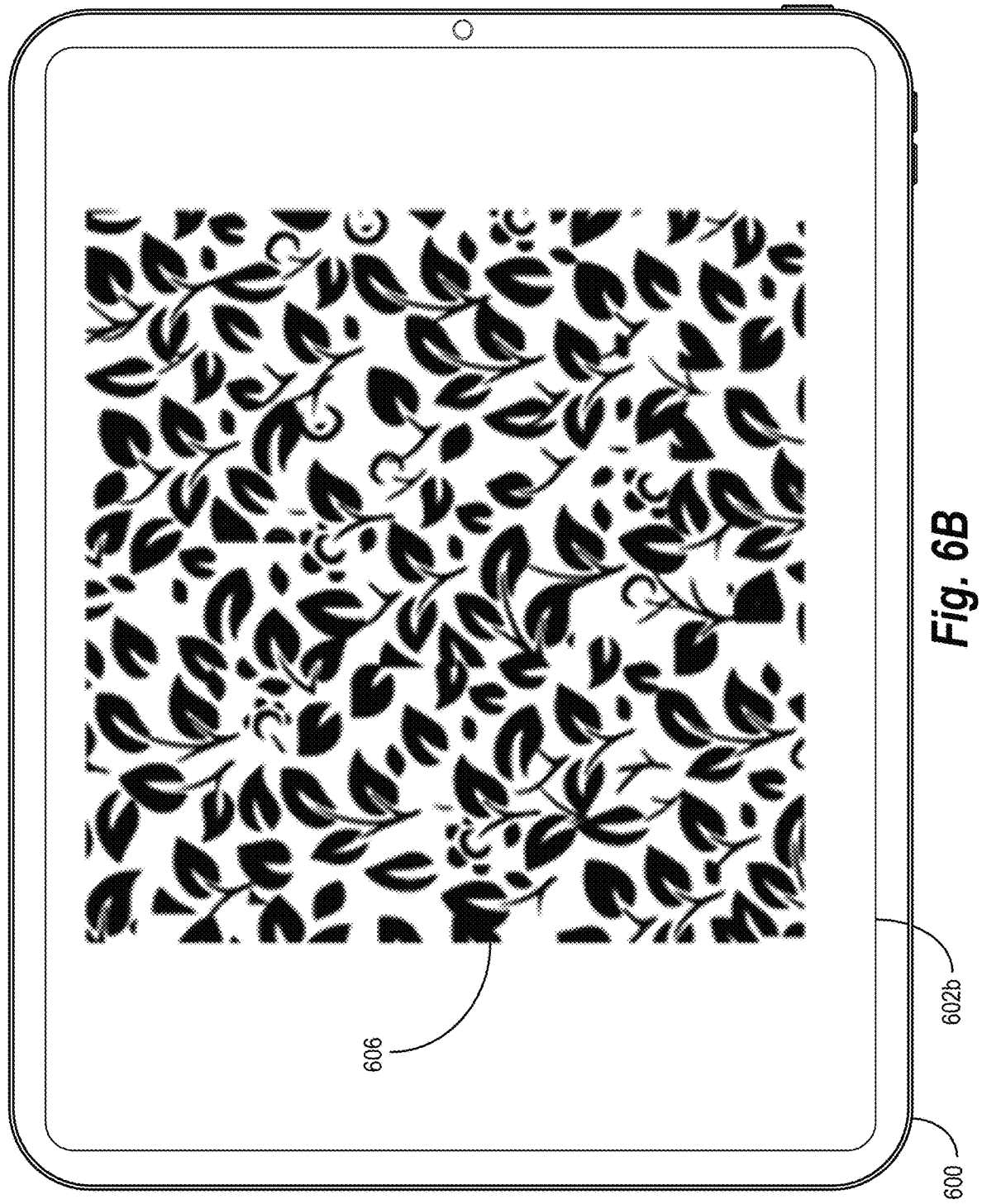

Moreover, via the user interface 602a, the computing device 600 identifies a user interaction to initiate an automatic synthesis process for the vector image 604. In response, the computing device 600 performs an iterative search-assign-clustering process as described in relation to the foregoing figures. Based on the iterative search-assign-clustering process, the computing device 600 identifies optimized output cluster configurations that the computing device 600 uses to reconstruct additional vector elements in a synthetic vector pattern. From the reconstructed additional vector elements, FIG. 6B shows the computing device 600 presenting the user interface 602b comprising a new vector image 606 with a synthetic vector pattern.

Figure 6C:
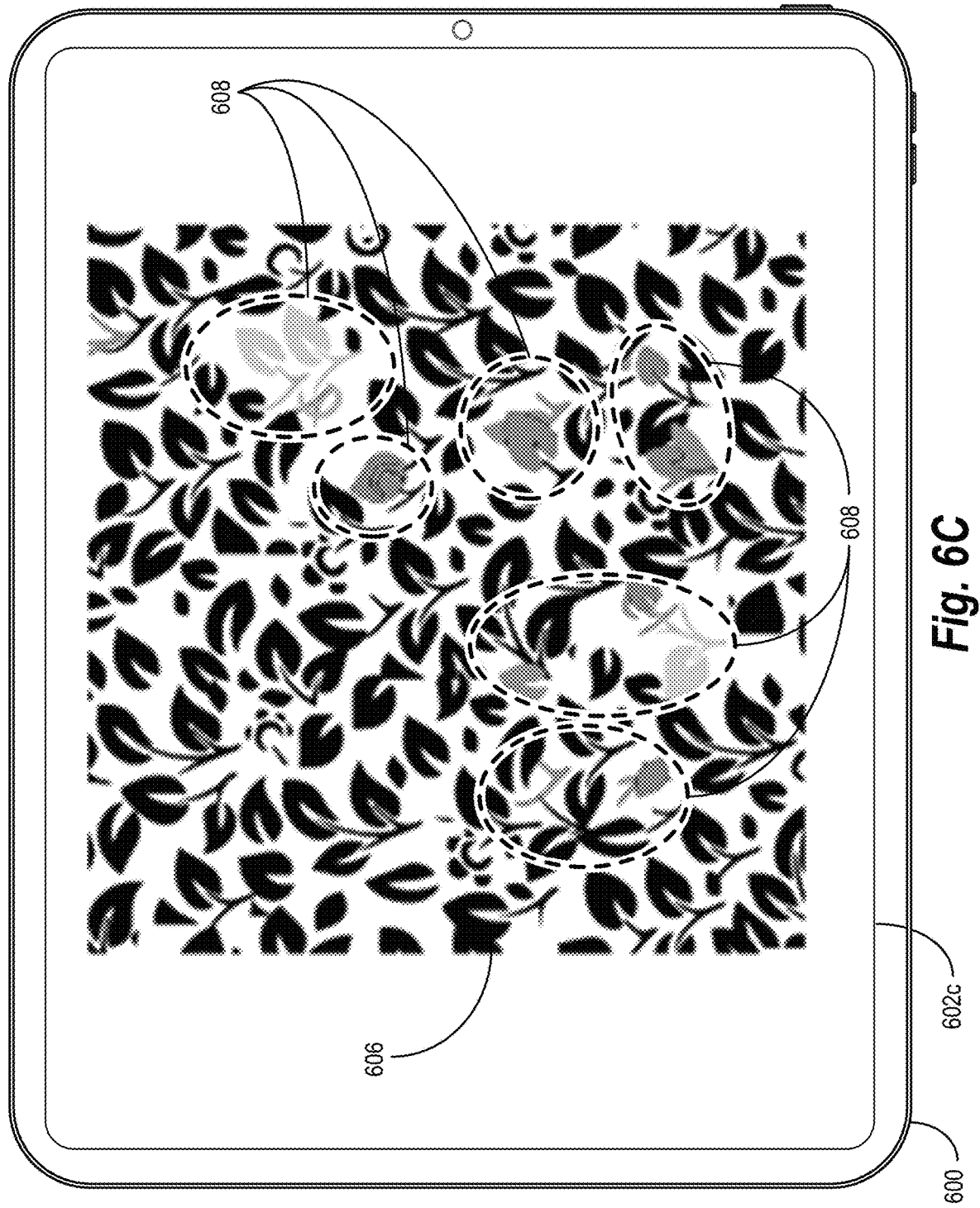
Figure 6D:
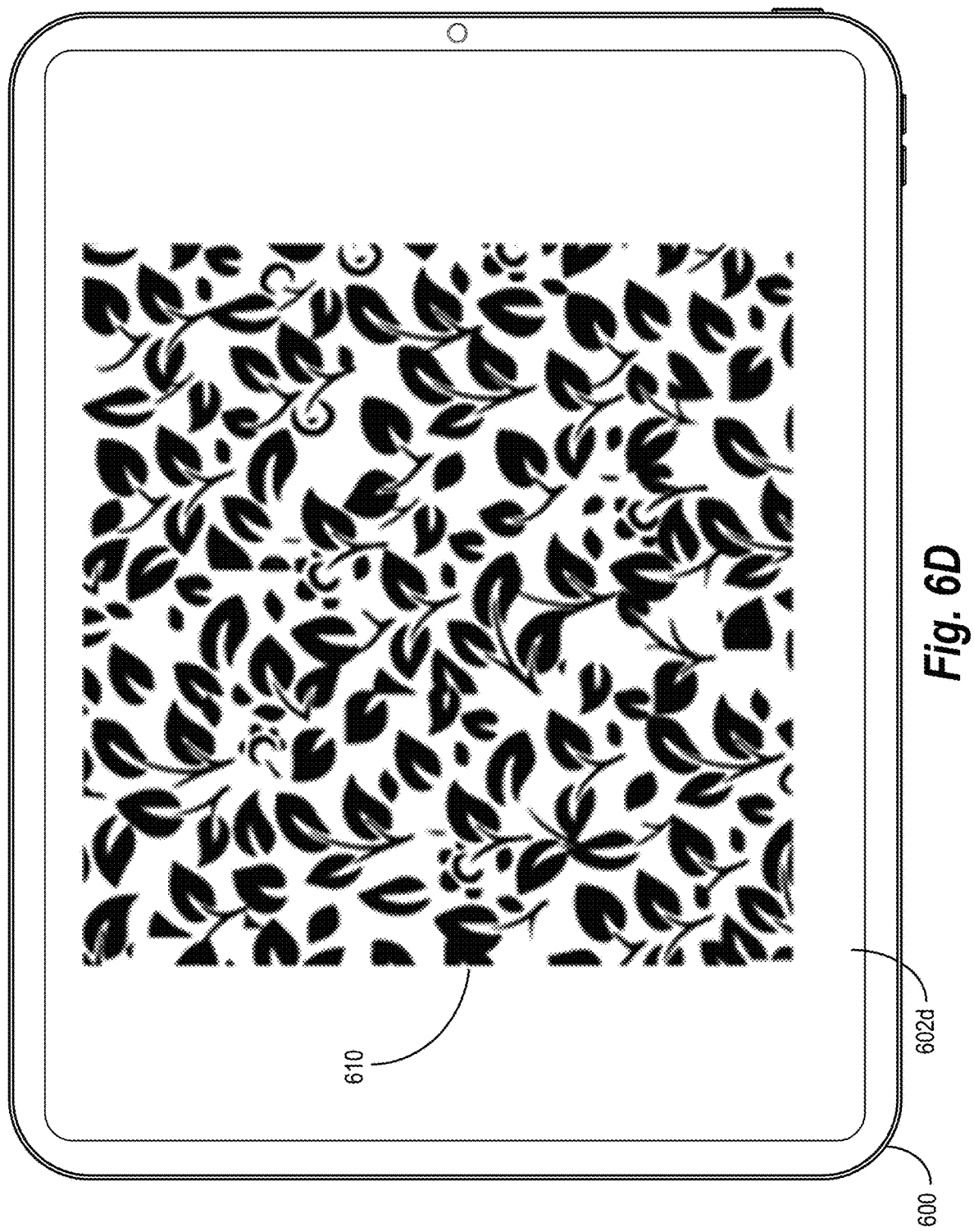

In FIG. 6C, the computing device 600 presents a user interface 602c in response to user interactions to modify the new vector image 606. Specifically, the user interface 602c comprises modifications 608. In one or more embodiments, the modifications 608 include rearranging one or more of the additional vector elements, adding a new additional vector element, and/or removing one or more of the additional vector elements. For example, the computing device 600 adds, removes, or alters vector elements in response to a user interaction (e.g., a tap, swipe, click, or drawing motion) with the user interface 602c via a vector graphic editing tool, selection tool, drawing tool, eraser tool, etc. In turn, FIG. 6D shows the computing device 600 presenting a user interface 602d comprising a modified new vector image 610 that incorporates the modifications 608.

As discussed above, the vector cluster texturing system 106 provides a number of advantages over conventional systems. FIG. 7 illustrates, in comparison to conventional systems, experimental results of implementing the vector cluster texturing system 106 to synthesize a vector pattern in accordance with one or more embodiments. Given an input vector image 702, the vector cluster texturing system 106 samples a clustered sample distribution depicted in data point sampling 704. In turn, the vector cluster texturing system 106 synthesizes output clusters depicted in output domain 712 to reconstruct vector elements for a synthetic vector pattern in a new vector image 714.

By contrast, given the same input vector image 702, certain conventional systems generate the experimental results depicted in vector images 706-708. Noticeably, the vector images 706-708 generated by conventional systems omit vector elements and fail to accurately recreate the vector structures from the input vector image 702.

Due to certain limitations of another conventional system, synthesized samples 710 depict the experimental synthesizing results of a conventional system. The synthesized samples 710 appear to lose the more fine structural details captured by the synthesized clusters of the output domain 712 from the vector cluster texturing system 106. Accordingly, the experimental results of FIG. 7 indicate that the vector cluster texturing system 106 significantly outperforms conventional systems on synthesizing structured vector textures.

Figure 8:
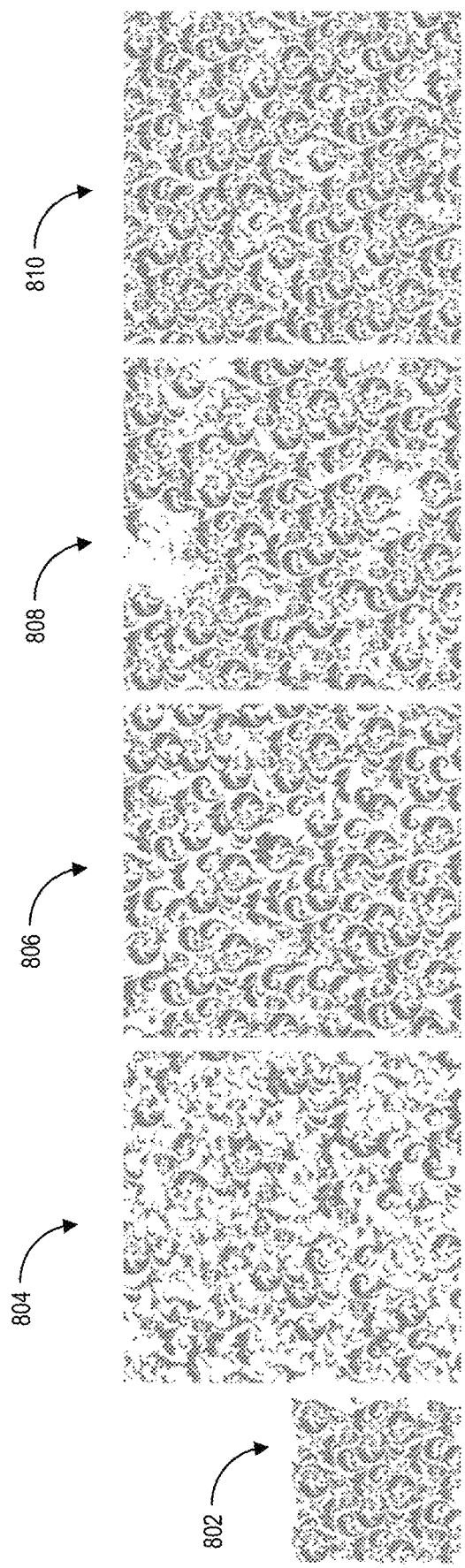
FIGS. 8, 9, and 10 illustrate experimental results of implementing a vector cluster texturing system in accordance with one or more embodiments.

FIG. 8 illustrates experimental results of implementing the vector cluster texturing system 106 in accordance with one or more embodiments. Specifically, FIG. 8 shows the vector cluster texturing system 106 generating, based on a vector image 802, a new vector image 804 without using cluster identifiers in the search step described above in relation to FIGS. 3A-3B, 4. In particular, the new vector image 804 comprises results with almost random element placement.

Similarly, FIG. 8 shows the vector cluster texturing system 106 generating, based on the vector image 802, a new vector image 806 without accounting for link energy $E_e$ in the optimization of function (15) discussed above. In particular, the new vector image 806 is missing certain elements withing the synthesized results (e.g., small, detailed shapes).

Further, FIG. 8 shows the vector cluster texturing system 106 generating, based on the vector image 802, a new vector image 808 without accounting for shape energy $E_s$ in the optimization of function (15) discussed above. Without consideration of shape energy, the new vector image 808 includes empty or broken regions.

In contrast, FIG. 8 also shows full experimental results of the vector cluster texturing system 106 generating a new vector image 810 by implementing cluster identifiers, link energy, and shape energy as described in relation to the foregoing figures. As shown, the new vector image 810 is substantially more accurate than the new vector images 804-808 without certain components.

Figure 9:
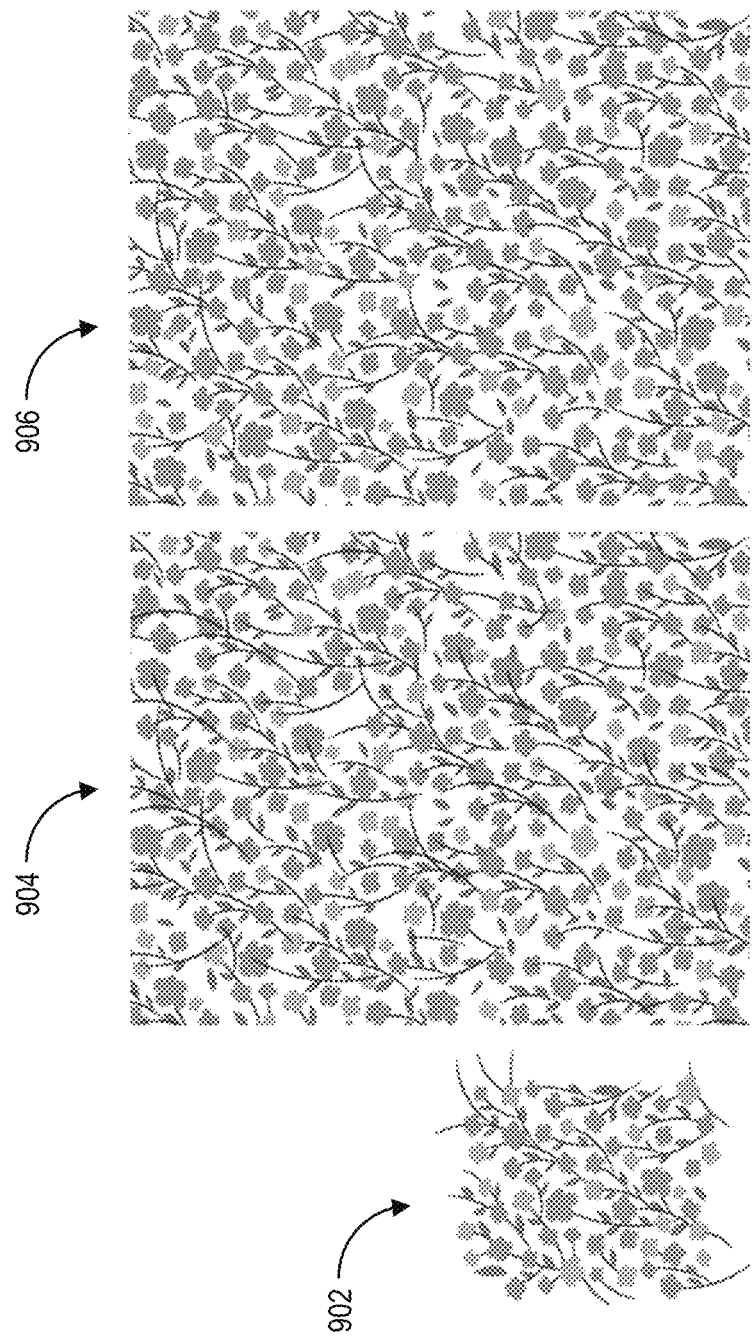

FIG. 9 illustrates experimental results of implementing the vector cluster texturing system 106 in accordance with one or more embodiments. In particular, FIG. 9 shows the vector cluster texturing system 106 generating, based on an vector image 902, a new vector image 904 without accounting for z-index (depth) assignment as described above in relation to FIG. 4. In contrast, FIG. 9 shows the vector cluster texturing system 106 generating, based on the vector image 902, a new vector image 906 by using depth assignment. As evident, the new vector image 906 largely preserves layer relationships from the vector image 902.

For example, the vector image 902 comprises vector elements that include elongated, branch-like portions positioned below or underneath other vector elements in the form of leaves. However, without depth assignment, the vector cluster texturing system 106 does not preserve such layer relationships (as depicted in the new vector image 904). Specifically, the new vector image 904 shows the branch-like vector elements incorrectly covering (e.g., protruding over or on top of) the leaf-like vector elements.

Figure 10:
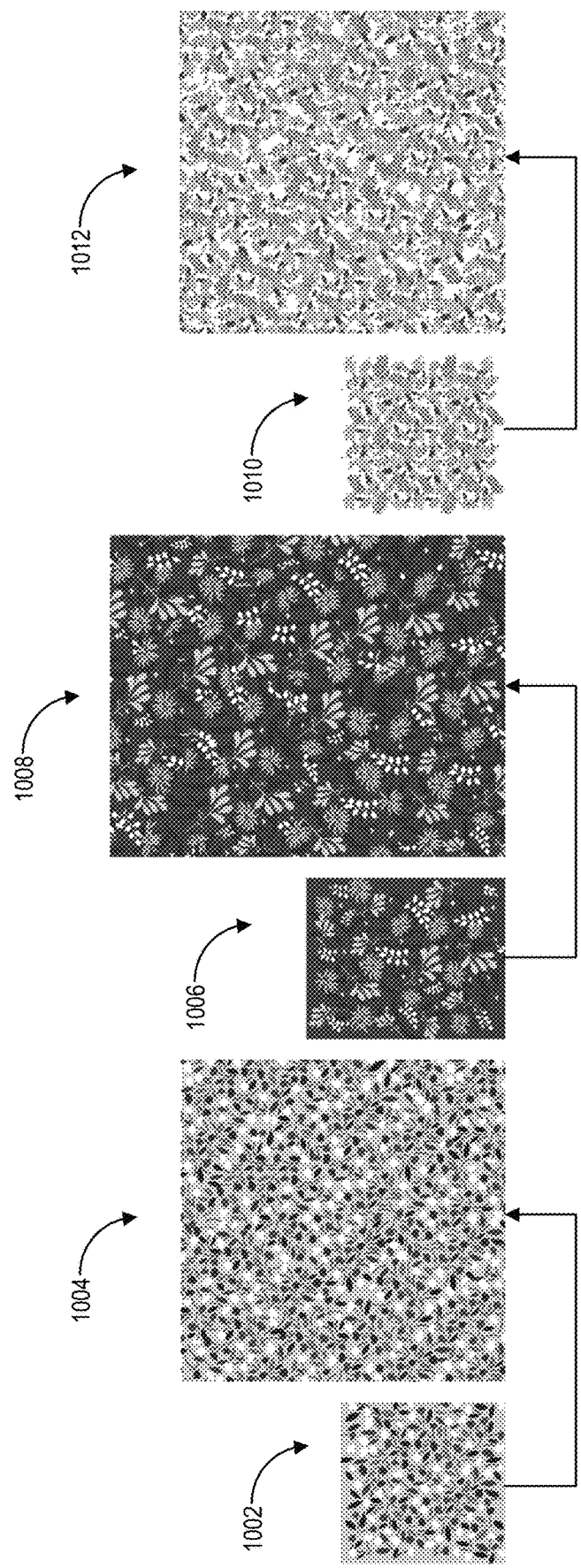

FIG. 10 illustrates experimental results of implementing the vector cluster texturing system 106 in accordance with one or more embodiments. As shown, the vector cluster texturing system 106 generates a new vector image 1004 based on a vector image 1002, a new vector image 1008 based on a vector image 1006, and a new vector image 1012 based on a vector image 1010. As shown in each of the new vector images 1004, 1008, and 1012, the vector cluster texturing system 106 accurately captures the detailed vector structures in the vector images 1002, 1006, and 1010 provided as inputs.

Figure 11:
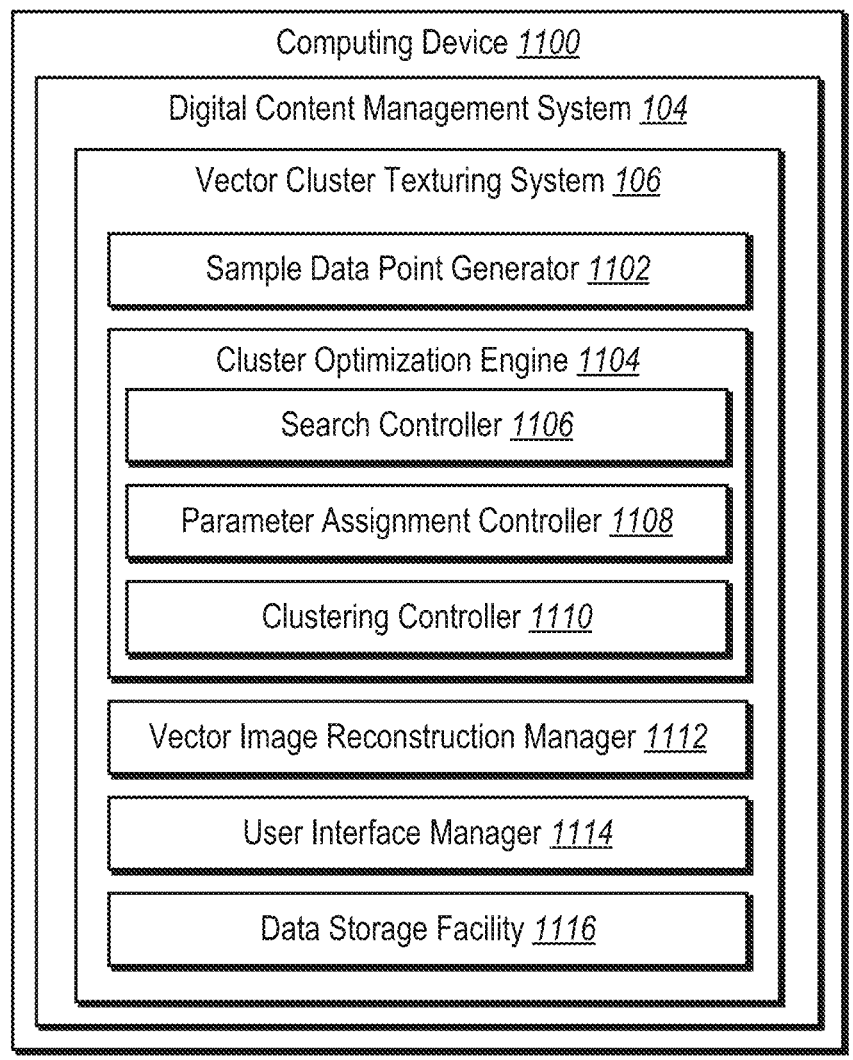
FIG. 11 illustrates an example schematic diagram of a vector cluster texturing system in accordance with one or more embodiments.

Turning to FIG. 11, additional detail will now be provided regarding various components and capabilities of the vector cluster texturing system 106. In particular, FIG. 11 illustrates an example schematic diagram of a computing device 1100 (e.g., the server(s) 102, the client device 108, and/or the computing device 600) implementing the vector cluster texturing system 106 in accordance with one or more embodiments of the present disclosure. As shown, the vector cluster texturing system 106 is implemented by the digital content management system 104. Also illustrated, the vector cluster texturing system 106 includes a sample data point generator 1102, a cluster optimization engine 1104, a vector image reconstruction manager 1112, a user interface manager 1114, and a data storage facility 1116.

In one or more embodiments, the sample data point generator 1102 generates sample data points from a vector image (as described in relation to the foregoing figures). In particular embodiments, the sample data point generator 1102 represents vector elements using a cluster of sample data points. In certain implementations, the sample data point generator 1102 implements multiple levels of hierarchical sampling with increasingly denser distributions.

Additionally, in one or more embodiments, the cluster optimization engine 1104 synthesizes output clusters of synthetic data points (as described in relation to the foregoing figures). In particular embodiments, the cluster optimization engine 1104 implements a search controller 1106, a parameter assignment controller 1108, and a clustering controller 1110. The search controller 1106 searches, for each synthetic data point, a corresponding sample data point with a most similar neighborhood to a synthetic neighborhood that includes the synthetic data point. The parameter assignment controller 1108 determines spatial parameters and appearance attributes for synthetic data points. The clustering controller 1110 implements a greedy, energy-based optimization algorithm for determining optimal configurations of output clusters. In particular embodiments, the clustering controller 1110 minimizes a link energy and a shape energy for optimal cluster configurations by using cluster operations of sample switching, cluster merging, and cluster splitting.

Further, in one or more embodiments, the vector image reconstruction manager 1112 reconstructs additional vector elements based on optimized output clusters (as described in relation to the foregoing figures). In particular embodiments, the vector image reconstruction manager 1112 translates a subset of vector elements from the vector image to populate the additional vector elements of the new vector image. To perform the reconstruction, the vector image reconstruction manager 1112 uses the subset of vector elements corresponding to one or more input clusters that have a minimized shape energy with one or more output clusters corresponding to the additional vector elements.

In one or more embodiments, the user interface manager 1114 provides, manages, and/or controls a graphical user interface (or simply "user interface"). In particular embodiments, the user interface manager 1114 generates and displays a user interface by way of a display screen composed of a plurality of graphical components, objects, and/or elements that allow a user to perform a function. For example, the user interface manager 1114 receives user inputs from a user, such as a click/tap to view, interact with, or edit a vector image. Additionally, in one or more embodiments, the user interface manager 1114 presents a variety of types of information, including text, rendered vector images, or other information for presentation in a user interface.

The data storage facility 1116 maintains data for the vector cluster texturing system 106. The data storage facility 1116 (e.g., via one or more memory devices) maintains data of any type, size, or kind, as necessary to perform the functions of the vector cluster texturing system 106. For example, the data storage facility 1116 stores vector images with vector patterns.

Each of the components of the computing device 1100 can include software, hardware, or both. For example, the components of the computing device 1100 can include one or more instructions stored on a computer-readable storage medium and executable by processors of one or more computing devices, such as a client device or server device. When executed by the one or more processors, the computer-executable instructions of the vector cluster texturing system 106 can cause the computing device(s) (e.g., the computing device 1100) to perform the methods described herein. Alternatively, the components of the computing device 1100 can include hardware, such as a special-purpose processing device to perform a certain function or group of functions. Alternatively, the components of the computing device 1100 can include a combination of computer-executable instructions and hardware.

Furthermore, the components of the computing device 1100 may, for example, be implemented as one or more operating systems, as one or more stand-alone applications, as one or more modules of an application, as one or more plug-ins, as one or more library functions or functions that may be called by other applications, and/or as a cloud-computing model. Thus, the components of the computing device 1100 may be implemented as a stand-alone application, such as a desktop or mobile application. Furthermore, the components of the computing device 1100 may be implemented as one or more web-based applications hosted on a remote server.

The components of the computing device 1100 may also be implemented in a suite of mobile device applications or "apps." To illustrate, the components of the computing device 1100 may be implemented in an application, including but not limited to ILLUSTRATOR®, ADOBE® FRESCO®, PHOTOSHOP®, PHOTOSHOP® ELEMENTS, LIGHTROOM®, LIGHTROOM® FOR MOBILE, ADOBE® PREMIERE®, or ADOBE® PREMIERE® ELEMENTS. Product names, including "ADOBE" and any other portion of one or more of the foregoing product names, may include registered trademarks or trademarks of Adobe Inc. in the United States and/or other countries.

Figure 12:
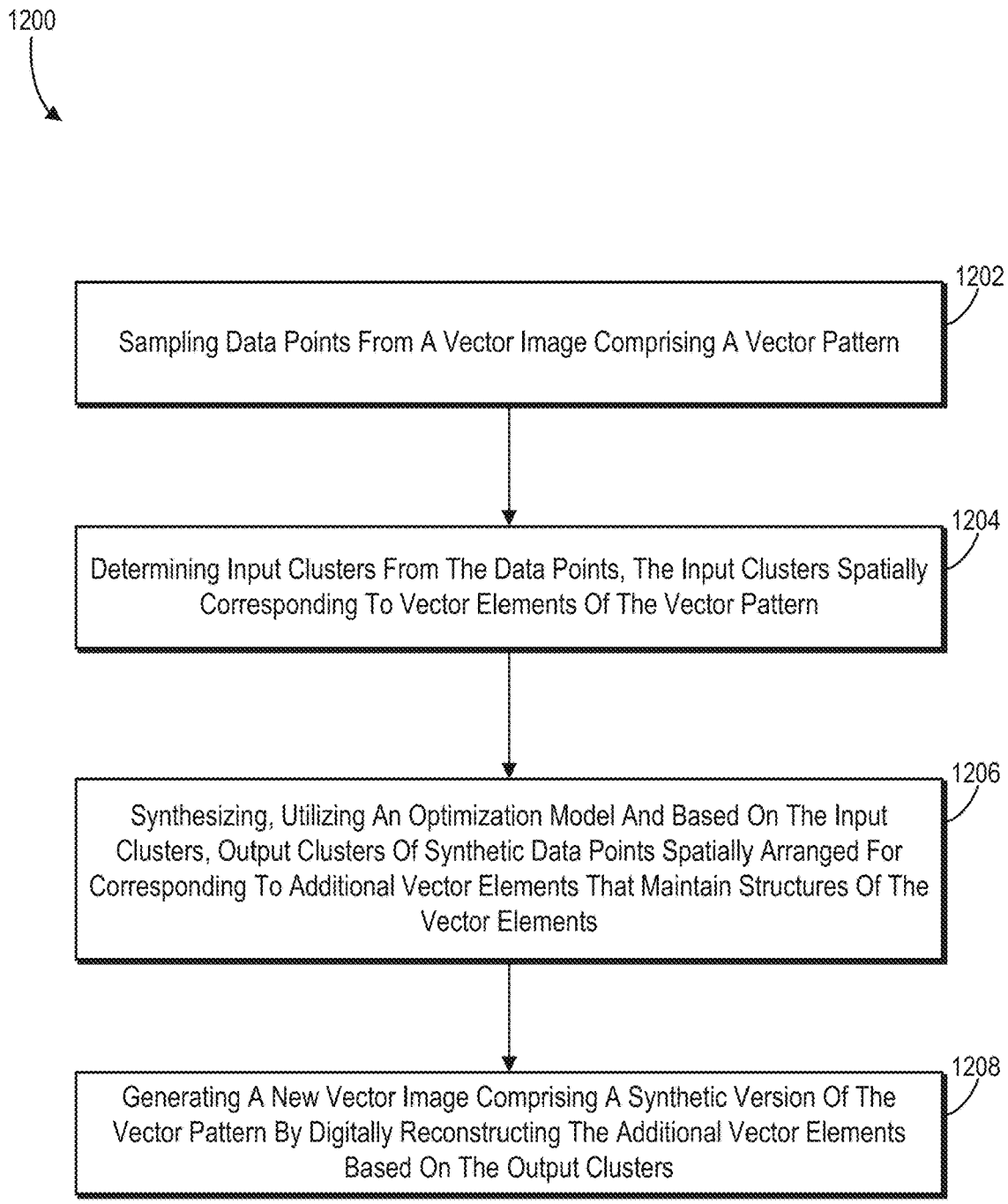
FIG. 12 illustrates a flowchart of a series of acts for generating a new vector image in accordance with one or more embodiments.

FIGS. 1-11, the corresponding text, and the examples provide several different systems, methods, techniques, components, and/or devices of the vector cluster texturing system 106 in accordance with one or more embodiments. In addition to the above description, one or more embodiments can also be described in terms of flowcharts including acts for accomplishing a particular result. For example, FIG. 12 illustrates a flowchart of a series of acts 1200 for generating a new vector image in accordance with one or more embodiments. The vector cluster texturing system 106 may perform one or more acts of the series of acts 1200 in addition to or alternatively to one or more acts described in conjunction with other figures. While FIG. 12 illustrates acts according to one embodiment, alternative embodiments may omit, add to, reorder, and/or modify any of acts shown in FIG. 12. Acts of FIG. 12 can be performed as part of a method. Alternatively, a non-transitory computer-readable medium can comprise instructions that, when executed by one or more processors, cause a computing device to perform acts of FIG. 12. In certain embodiments, a system can perform acts of FIG. 12.

As shown, the series of acts 1200 includes act 1202 of sampling data points from a vector image comprising a vector pattern. The series of acts 1200 also includes act 1204 of determining input clusters from the data points, the input clusters spatially corresponding to vector elements of the vector pattern.

In addition, the series of acts 1200 includes act 1206 of synthesizing, utilizing an optimization model and based on the input clusters, output clusters of synthetic data points spatially arranged for corresponding to additional vector elements that maintain structures of the vector elements. In one or more embodiments, synthesizing the output clusters comprises: determining, utilizing a neighborhood similarity, matching neighborhood pairs by matching sample neighborhoods of the data points to synthetic neighborhoods of the synthetic data points; and clustering, utilizing the optimization model, the synthetic data points based on cluster identifiers for clusters corresponding to the matching neighborhood pairs.

The series of acts 1200 further includes act 1208 of generating a new vector image comprising a synthetic version of the vector pattern by digitally reconstructing the additional vector elements based on the output clusters. In one or more embodiments, generating the new vector image by reconstructing the additional vector elements comprises: determining the subset of vector elements by filtering out one or more vector elements corresponding to an additional vector element based on at least one output cluster having a shape energy that satisfies a threshold shape energy; and translating the subset of vector elements from the vector image to populate the additional vector elements of the new vector image, the subset of vector elements corresponding to one or more input clusters that have a minimized shape energy with one or more output clusters corresponding to the additional vector elements.

It is understood that the outlined acts in the series of acts 1200 are only provided as examples, and some of acts may be optional, combined into fewer acts, or expanded into additional acts without detracting from the essence of the disclosed embodiments. Additionally, acts described herein may be repeated or performed in parallel with one another or in parallel with different instances of the same or similar acts. As an example of an additional act not shown in FIG. 12, act(s) in the series of acts 1200 may include act of determining the matching neighborhood pairs by combining: unary sample similarities between the data points and the synthetic data points independent of the cluster identifiers; and pairwise sample similarities between pairs of data points and synthetic data points based on the cluster identifiers.

In certain implementations, determining the matching neighborhood pairs comprises optimizing the unary sample similarities utilizing a cost matrix; and optimizing the pairwise sample similarities by: matching cluster identifiers for data points corresponding to input clusters and cluster identifiers for synthetic data points corresponding to output clusters; and matching the data points to the synthetic data points utilizing matched cluster identifiers.

As another example of an additional act not shown in FIG. 12, act(s) in the series of acts 1200 may include act of: determining the unary sample similarities by matching the data points to the synthetic data points based on differences between corresponding spatial parameters; and determining the pairwise sample similarities by determining at least one of: a pair of data points with a set of same identifiers matched to a pair of synthetic data points with another set of same cluster identifiers; or a pair of data points with a set of differing cluster identifiers matched to a pair of synthetic data points with another set of differing cluster identifiers.

In yet another example of an additional act not shown in FIG. 12, act(s) in the series of acts 1200 may include act of clustering the synthetic data points utilizing the optimization model based on link energies between adjacent output clusters and shape energies between shapes of the output clusters and shapes of the input clusters.

As a further example of an additional act not shown in FIG. 12, act(s) in the series of acts 1200 may include act of: determining the link energies between the adjacent output clusters by determining, for each link energy, a link confidence indicating a level of affinity between adjacent synthetic data points; and determining the shape energies based on shape differentials between the shapes of the output clusters and the shapes of the input clusters.

As an additional example of act not shown in FIG. 12, act(s) in the series of acts 1200 may include act of determining the shape energies based on the shape differentials by determining: shape distances between the input clusters and the output clusters; and translation distances between data points and synthetic data points matched together in corresponding input clusters and output clusters.

As one example of an additional act not shown in FIG. 12, act(s) in the series of acts 1200 may include act of generating a processing queue of cluster operations to reduce the shape energies and the link energies, the cluster operations comprising: switching a synthetic data point from a first output cluster to a second output cluster; merging two or more separate output clusters together; and splitting an output cluster into two or more separate output clusters.

As another example of an additional act not shown in FIG. 12, act(s) in the series of acts 1200 may include act of minimizing the shape energies and the link energies by: prioritizing the cluster operations within the processing queue according to energy reduction; and iteratively performing and updating prioritized cluster operations until achieving a max iteration threshold or at least one of the shape energies or the link energies is not reduced.

In yet another example of an additional act not shown in FIG. 12, act(s) in the series of acts 1200 may include act of: generating sample data points from the vector image; determining, based on the sample data points, input clusters spatially corresponding to vector elements of the vector pattern; synthesizing output clusters of synthetic data points spatially arranged for corresponding to additional vector elements that map to the vector elements by: (i) determining, utilizing a neighborhood similarity, matching neighborhood pairs comprising sample neighborhoods of the sample data points matched to synthetic neighborhoods of the synthetic data points; and (ii) clustering, utilizing an optimization model, the synthetic data points based on cluster identifiers for clusters corresponding to the matching neighborhood pairs; and generating a new vector image comprising a synthetic version of the vector pattern by translating, according to the optimization model, a subset of vector elements corresponding to the input clusters to populate the additional vector elements corresponding to the output clusters.

Still further, in another example of an additional act not shown in FIG. 12, act(s) in the series of acts 1200 may include act of determining the matching neighborhood pairs by determining: unary sample similarities between the sample data points and the synthetic data points independent of the cluster identifiers; pairwise sample similarities between pairs of sample data points and synthetic data points based on the cluster identifiers; and induced costs corresponding to one or more synthetic data points unmatched to one or more sample data points.

Additionally, in another example of act not shown in FIG. 12, act(s) in the series of acts 1200 may include act of determining the unary sample similarities by matching the sample data points to the synthetic data points based on a weighted sum of differences between corresponding spatial parameters and a weighted sum of differences between corresponding appearance parameters; and determining the pairwise sample similarities by matching pairs of sample data points and pairs of synthetic data points such that: (i) cluster identifiers for paired sample data points are identical to each other and cluster identifiers for paired synthetic data points are identical to each other; or (ii) cluster identifiers for paired sample data points are different from each other and cluster identifiers for paired synthetic data points are different from each other.

As another example of act not shown in FIG. 12, act(s) in the series of acts 1200 may include act of determining the matching neighborhood pairs by: optimizing a sum of the unary sample similarities and a sum of the induced costs utilizing a cost matrix; and optimizing the pairwise sample similarities by: matching cluster identifiers for sample data points corresponding to input clusters and cluster identifiers for synthetic data points corresponding to output clusters; and matching the sample data points to the synthetic data points utilizing matched cluster identifiers.

In yet another example of act not shown in FIG. 12, act(s) in the series of acts 1200 may include act of: determining link energies between adjacent output clusters by determining, for each link energy, a link confidence indicating a level of affinity between adjacent synthetic data points; determining shape energies based on shape differentials between shapes of the output clusters and shapes of the input clusters; and clustering the synthetic data points utilizing the optimization model based on the link energies and the shape energies.

Still further, in another example of act not shown in FIG. 12, act(s) in the series of acts 1200 may include act of: iteratively performing cluster operations to reduce the shape energies and the link energies by: prioritizing the cluster operations within a processing queue according to energy reduction; and performing and updating prioritized cluster operations until achieving a max iteration threshold or at least one of the shape energies or the link energies is not reduced.

As one example of an additional act not shown in FIG. 12, act(s) in the series of acts 1200 may include act of: identifying, based on a user selection, a vector image comprising a vector pattern; performing hierarchical sampling to generate sample data points from the vector image; determining input clusters from the sample data points, the input clusters spatially corresponding to vector elements of the vector pattern based on cluster identifiers; and generating a new vector image comprising a synthetic version of the vector pattern by digitally reconstructing the additional vector elements based on the output clusters.

As another example of an additional act not shown in FIG. 12, act(s) in the series of acts 1200 may include act of: performing the hierarchical sampling by sampling at a first rate for a first sampling iteration and sampling at a second rate for a second sampling iteration, the second sampling rate being greater than the first sampling rate to achieve a higher resolution sampling in the second sampling iteration than in the first sampling iteration.

In yet another example of an additional act not shown in FIG. 12, act(s) in the series of acts 1200 may include act of: presenting the new vector image for display within a graphical user interface of a client device; generating a modified version of the new vector image by performing modifications to the new vector image in response to identifying user input via the graphical user interface, the modifications comprising at least one of rearranging one or more of the additional vector elements, adding a new additional vector element, or removing one or more of the additional vector elements; and presenting the modified version of the new vector image for display within the graphical user interface.

In addition (or in the alternative) to acts described above, in certain embodiments, the series of acts 1200 can include performing, based on the input clusters, a step for synthesizing output clusters of synthetic data points spatially arranged for corresponding to additional vector elements. For instance, acts and algorithms described above in relation to FIGS. 3A-3B, 4, and 5 can comprise the corresponding acts (or structure) for performing, based on the input clusters, a step for synthesizing output clusters of synthetic data points spatially arranged for corresponding to additional vector elements.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In certain embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 13:
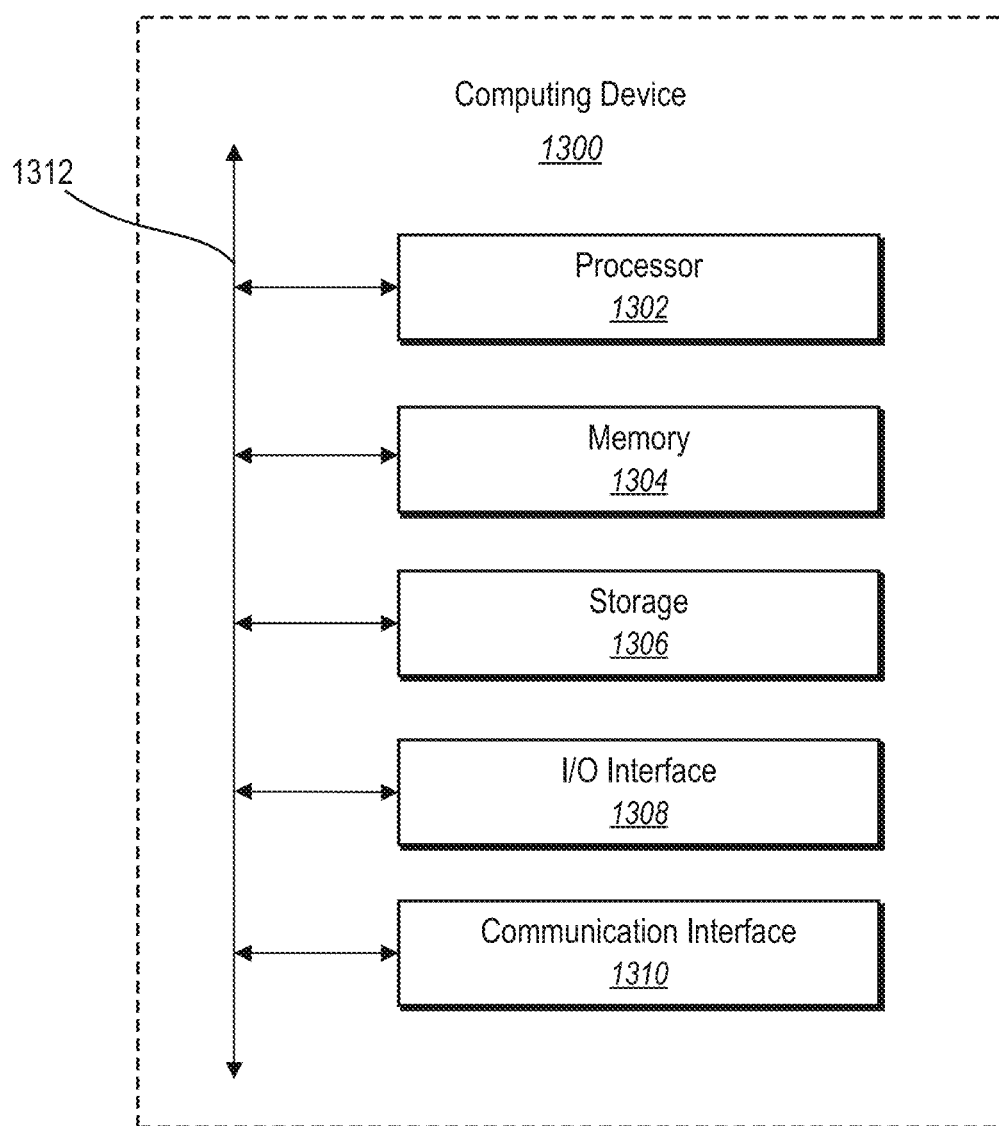
FIG. 13 illustrates a block diagram of an example computing device for implementing one or more embodiments of the present disclosure.

FIG. 13 illustrates a block diagram of an example computing device 1300 that may be configured to perform one or more of the processes described above. One will appreciate that one or more computing devices, such as the computing device 1300 may represent the computing devices described above (e.g., the server(s) 102, the client device 108, the computing device 600, and/or the computing device 1100). In one or more embodiments, the computing device 1300 may be a mobile device (e.g., a mobile telephone, a smartphone, a PDA, a tablet, a laptop, a camera, a tracker, a watch, a wearable device, etc.). In certain embodiments, the computing device 1300 may be a non-mobile device (e.g., a desktop computer or another type of client device). Further, the computing device 1300 may be a server device that includes cloud-based processing and storage capabilities.

As shown in FIG. 13, the computing device 1300 can include one or more processor(s) 1302, memory 1304, a storage device 1306, input/output interfaces 1308 (or "I/O interfaces 1308"), and a communication interface 1310, which may be communicatively coupled by way of a communication infrastructure (e.g., bus 1312). While the computing device 1300 is shown in FIG. 13, the components illustrated in FIG. 13 are not intended to be limiting. Additional or alternative components may be used in other embodiments. Furthermore, in certain embodiments, the computing device 1300 includes fewer components than those shown in FIG. 13. Components of the computing device 1300 shown in FIG. 13 will now be described in additional detail.

In particular embodiments, the processor(s) 1302 includes hardware for executing instructions, such as those making up a computer program. As an example, and not by way of limitation, to execute instructions, the processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example, and not by way of limitation, the storage device 1306 can include a non-transitory storage medium described above. The storage device 1306 may include a hard disk drive (HDD), flash memory, a Universal Serial Bus (USB) drive or a combination these or other storage devices.

As shown, the computing device 1300 includes one or more I/O interfaces 1308, which are provided to allow a user to provide input to (such as user strokes), receive output from, and otherwise transfer data to and from the computing device 1300. These I/O interfaces 1308 may include a mouse, keypad or a keyboard, a touch screen, camera, optical scanner, network interface, modem, other known I/O devices or a combination of such I/O interfaces 1308. The touch screen may be activated with a stylus or a finger.

The I/O interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1308 are configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 provides one or more interfaces for communication (such as, for example, packet-based communication) between the computing device and one or more other computing devices or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can include hardware, software, or both that connects components of the computing device 1300 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable storage medium storing executable instructions which, when executed by a processing device, cause the processing device to perform operations comprising:
    sampling data points from a vector image comprising a vector pattern;
    determining input clusters from the data points, the input clusters spatially corresponding to vector elements of the vector pattern;
    synthesizing, utilizing an optimization model and based on the input clusters, output clusters of synthetic data points spatially arranged for corresponding to additional vector elements that maintain structures of the vector elements by clustering synthetic data points utilizing the optimization model to iteratively perform acts until a stopping criterion is met based on link energies between output clusters and shape energies between input clusters and output clusters by:
        performing sample switching by switching a synthetic data point from a first output cluster to a second output cluster adjacent to the first output cluster;
        performing cluster merging by merging two or more separate output clusters; and
        performing cluster splitting by splitting an output cluster into two or more output clusters; and
    generating a new vector image comprising a synthetic version of the vector pattern by digitally reconstructing the additional vector elements based on the output clusters.

2. The non-transitory computer-readable storage medium of claim 1, the operations further comprising synthesizing the output clusters by:
    determining, utilizing a neighborhood similarity, matching neighborhood pairs by matching sample neighborhoods of the data points to synthetic neighborhoods of the synthetic data points; and
    clustering, utilizing the optimization model, the synthetic data points based on cluster identifiers for clusters corresponding to the matching neighborhood pairs.

3. The non-transitory computer-readable storage medium of claim 2, the operations further comprising determining the matching neighborhood pairs by combining:
    unary sample similarities between the data points and the synthetic data points independent of the cluster identifiers; and
    pairwise sample similarities between pairs of data points and synthetic data points based on the cluster identifiers.

4. The non-transitory computer-readable storage medium of claim 3, the operations further comprising:
    determining the unary sample similarities by matching the data points to the synthetic data points based on differences between corresponding spatial parameters; and
    determining the pairwise sample similarities by determining at least one of:
        a pair of data points with a set of same cluster identifiers matched to a pair of synthetic data points with another set of same cluster identifiers; or
        a pair of data points with a set of differing cluster identifiers matched to a pair of synthetic data points with another set of differing cluster identifiers.

5. The non-transitory computer-readable storage medium of claim 3, the operations further comprising determining the matching neighborhood pairs by:
    optimizing the unary sample similarities utilizing a cost matrix; and
    optimizing the pairwise sample similarities by:
        matching cluster identifiers for data points corresponding to input clusters and cluster identifiers for synthetic data points corresponding to output clusters; and
        matching the data points to the synthetic data points utilizing matched cluster identifiers.

6. The non-transitory computer-readable storage medium of claim 1, the operations further comprising: performing an iterative process of clustering the synthetic data points utilizing the optimization model based on a minimization of link energies between adjacent output clusters and a minimization of shape energies between shapes of the output clusters and shapes of the input clusters.

7. The non-transitory computer-readable storage medium of claim 6, the operations further comprising: determining the link energies between the adjacent output clusters by determining, for each link energy, a link confidence indicating a level of affinity between adjacent synthetic data points; and
    determining the shape energies based on shape differentials between the shapes of the output clusters and the shapes of the input clusters.

8. The non-transitory computer-readable storage medium of claim 7, the operations further comprising determining the shape energies based on the shape differentials by determining:
shape distances between the input clusters and the output clusters; and
translation distances between data points and synthetic data points matched together in corresponding input clusters and output clusters.

9. The non-transitory computer-readable storage medium of claim 6, the operations further comprising generating a processing queue of cluster operations to reduce the shape energies and the link energies, the cluster operations comprising performing the sample switching wherein the first output cluster and the second output cluster are adjacent comprises determining the first output cluster is within a threshold distance of the second output cluster.

10. The non-transitory computer-readable storage medium of claim 9, the operations further comprising minimizing the shape energies and the link energies by:
prioritizing the cluster operations within the processing queue according to energy reduction; and
iteratively performing and updating prioritized cluster operations until achieving a max iteration threshold or at least one of the shape energies or the link energies is not reduced.

11. A system comprising:
a memory component comprising a vector image that comprises a vector pattern; and
one or more processing devices coupled to the memory component, the one or more processing devices to perform operations comprising:
generating sample data points from the vector image;
determining, based on the sample data points, input clusters spatially corresponding to vector elements of the vector pattern;
synthesizing output clusters of synthetic data points spatially arranged for corresponding to additional vector elements that map to the vector elements by:
determining, utilizing a neighborhood similarity, matching neighborhood pairs comprising sample neighborhoods of the sample data points matched to synthetic neighborhoods of the synthetic data points; and
clustering, utilizing an optimization model, the synthetic data points based on cluster identifiers for clusters corresponding to the matching neighborhood pairs to iteratively perform acts until a stopping criterion is met based on link energies between output clusters and shape energies between input clusters and output clusters by:
performing sample switching by switching a synthetic data point from a first output cluster to a second output cluster adjacent to the first output cluster;
performing cluster merging by merging two or more separate output clusters; and
performing cluster splitting by splitting an output cluster into two or more output clusters; and
generating a new vector image comprising a synthetic version of the vector pattern by translating, according to the optimization model, a subset of vector elements corresponding to the input clusters to populate the additional vector elements corresponding to the output clusters.

12. The system of claim 11, the operations further comprising determining the matching neighborhood pairs by determining:
unary sample similarities between the sample data points and the synthetic data points independent of the cluster identifiers;
pairwise sample similarities between pairs of sample data points and synthetic data points based on the cluster identifiers; and
induced costs corresponding to one or more synthetic data points unmatched to one or more sample data points.

13. The system of claim 12, the operations further comprising:
determining the unary sample similarities by matching the sample data points to the synthetic data points based on a weighted sum of differences between corresponding spatial parameters and a weighted sum of differences between corresponding appearance parameters; and
determining the pairwise sample similarities by matching pairs of sample data points and pairs of synthetic data points such that:
cluster identifiers for paired sample data points are identical to each other and cluster identifiers for paired synthetic data points are identical to each other; or
cluster identifiers for paired sample data points are different from each other and cluster identifiers for paired synthetic data points are different from each other.

14. The system of claim 13, the operations further comprising: determining the matching neighborhood pairs by:
optimizing a sum of the unary sample similarities and a sum of the induced costs utilizing a cost matrix; and
optimizing the pairwise sample similarities by:
matching cluster identifiers for sample data points corresponding to input clusters and cluster identifiers for synthetic data points corresponding to output clusters; and
matching the sample data points to the synthetic data points utilizing matched cluster identifiers.

15. The system of claim 11, the operations further comprising: determining link energies between adjacent output clusters by determining, for each link energy, a link confidence indicating a level of affinity between adjacent synthetic data points;
determining shape energies based on shape differentials between shapes of the output clusters and shapes of the input clusters; and
clustering the synthetic data points utilizing the optimization model based on the link energies and the shape energies.

16. The system of claim 15, the operations further comprising: iteratively performing cluster operations to reduce the shape energies and the link energies by:
prioritizing the cluster operations within a processing queue according to energy reduction; and
performing and updating prioritized cluster operations until achieving a max iteration threshold or at least one of the shape energies or the link energies is not reduced.

17. The system of claim 11, the operations further comprising generating the new vector image by reconstructing the additional vector elements based on the output clusters, the reconstruction comprising:
determining the subset of vector elements by filtering out one or more vector elements corresponding to an additional vector element based on at least one output cluster having a shape energy that satisfies a threshold shape energy; and translating the subset of vector elements from the vector image to populate the additional vector elements of the new vector image, the subset of vector elements corresponding to one or more input clusters that have a minimized shape energy with one or more output clusters corresponding to the additional vector elements.

18. A method comprising:

identifying, based on a user selection, a vector image comprising a vector pattern;

performing hierarchical sampling to generate sample data points from the vector image;

determining input clusters from the sample data points, the input clusters spatially corresponding to vector elements of the vector pattern based on cluster identifiers;

synthesizing output clusters of synthetic data points spatially arranged for corresponding to additional vector elements by clustering synthetic data points utilizing an optimization model until a stopping criterion is met based on link energies between output clusters and shape energies between input clusters and output clusters by:

performing sample switching by switching a synthetic data point from a first output cluster to a second output cluster adjacent to the first output cluster;

performing cluster merging by merging two or more separate output clusters; and performing cluster splitting by splitting an output cluster into two or more output clusters; and generating a new vector image comprising a synthetic version of the vector pattern by digitally reconstructing the additional vector elements based on the output clusters.

19. The method of claim 18, wherein performing the hierarchical sampling comprises sampling at a first rate for a first sampling iteration and sampling at a second rate for a second sampling iteration, the second sampling rate being greater than the first sampling rate to achieve a higher resolution sampling in the second sampling iteration than in the first sampling iteration.

20. The method of claim 18, further comprising:

presenting the new vector image for display within a graphical user interface of a client device;

generating a modified version of the new vector image by performing modifications to the new vector image in response to identifying user input via the graphical user interface, the modifications comprising at least one of re-arranging one or more of the additional vector elements, adding a new additional vector element, or removing one or more of the additional vector elements; and presenting the modified version of the new vector image for display within the graphical user interface.

* * * * *